(12) United States Patent
Robertson

(10) Patent No.: US 11,492,439 B2
(45) Date of Patent: Nov. 8, 2022

(54) POLY(ACETAL) ELASTOMERS

(71) Applicant: WiSys Technology Foundation, Inc., Madison, WI (US)

(72) Inventor: Nicholas John Robertson, Ashland, WI (US)

(73) Assignee: WiSys Technology Foundation, Inc., Madison, WI (US)

( * ) Notice: Subject to any disclaimer, the term of this patent is extended or adjusted under 35 U.S.C. 154(b) by 269 days.

(21) Appl. No.: 16/723,177

(22) Filed: Dec. 20, 2019

(65) Prior Publication Data

US 2020/0199283 A1 Jun. 25, 2020

Related U.S. Application Data

(60) Provisional application No. 62/783,820, filed on Dec. 21, 2018.

(51) Int. Cl.
*C08G 4/00* (2006.01)
*C08L 59/02* (2006.01)

(52) U.S. Cl.
CPC .............. *C08G 4/00* (2013.01); *C08L 59/02* (2013.01)

(58) Field of Classification Search
None
See application file for complete search history.

(56) References Cited

U.S. PATENT DOCUMENTS

2008/0039567 A1* 2/2008 Shimoda ............... C08L 59/00 524/405
2011/0021658 A1* 1/2011 Selifonov ............... C08L 59/00 523/122

OTHER PUBLICATIONS

Hufendiek, Andrea, et al., "Polycycloacetals via polytransacetalization of diglycerol bisacetonide", Polymer Chemistry, 38(9), (2018), 4789-4797.
Law, Ariah C, et al., "Synthesis and material properties of elastomeric high molecular weight polycycloacetals derived from diglycerol and meso-erythritol", Journal of Applied Polymer Science, 137, 48780, (2019), 6 pgs.
Lingier, Sophie, et al., "High molecular weight poly(cycloacetals) towards processable polymer materials", Polymer, 103, (2016), 98-103.

* cited by examiner

*Primary Examiner* — Christopher M Rodd
(74) *Attorney, Agent, or Firm* — Schwegman Lundberg & Woessner, P.A.

(57) ABSTRACT

This disclosure describes various poly(acetal) polymers including processable, elastomeric poly(acetals). Various polymers described herein have a chemical structure containing cyclic acetal monomer units derived from diglycerol and a dialdehyde compound. The disclosure also relates to a method of preparing such polymers. The method can involve heating and/or adding acid to a mixture containing diglycerol and a dicarbonyl compound so as to obtain an elastomeric polymer.

19 Claims, 4 Drawing Sheets

POLY(ACETAL) ELASTOMERS

CROSS-REFERENCE TO RELATED APPLICATION

This application claims the benefit of priority to U.S. Provisional Patent Application Ser. No. 62/783,820 filed Dec. 21, 2018, the disclosure of which is incorporated herein in its entirety by reference.

STATEMENT OF GOVERNMENT SUPPORT

This invention was made with the support of the National Science Foundation under grant number CHE-1609765. The Government has certain rights in the invention.

BACKGROUND

Poly(acetals) are a class of polymers derived from polymerization of an aldehyde or ketone component and a diol component. A poly(acetal) derived from polymerization of a ketone and a diol component may also be referred to as a poly(ketal). The archetypical poly(acetal) is polyoxymethylene, which is derived from polymerization of formaldehyde and is commonly used as both a homopolymer and as a copolymer mixed together with a diol. Although polyoxymethylene has found widespread commercial use, other poly(acetals) have not proven similarly useful due to having lower thermal and pH stabilities.

Poly(cycloacetals) are a subset of poly(acetals) that have cyclic acetals in the polymer backbone, typically arising from reaction of a dialdehyde component and a component containing four alcohol moieties. For example, poly(cycloacetals) have been prepared by combining pentaerythritol or di-trimethylolpropane with glutaraldehyde. Various prior methods of preparing poly(cycloacetals) have resulted in hard, thermally stable polymers lacking useful physical properties (Lingier et al., Polymer 103 (2016), 98-103).

Glycerol is a bio-renewable industrial byproduct, which is produced in large amounts during biodiesel production. Glycerol is currently generated at a rate of more than 1.5M tons/year, which far outpaces its demand. Glycerol is available in many forms, including as a diglycerol dimer, in either crude or purified forms.

SUMMARY OF THE INVENTION

The present disclosure provides processable, elastomeric polymers containing poly(cycloacetal) monomer units derived from a diglycerol or erythritol. The poly(cycloacetal) polymer has monomers according to one or more of Formula I, Formula II and Formula III.

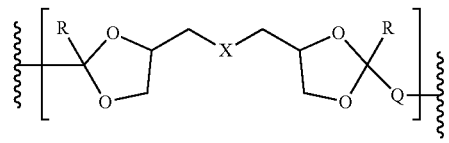

Formula I

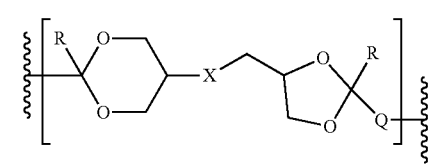

Formula II

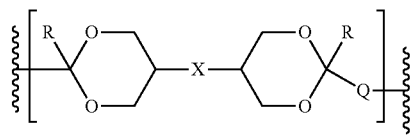

Formula III

In Formula I, Formula II and Formula III, at each occurrence, R is a monovalent group independently selected from H, substituted $C_1$-$C_{10}$ alkyl, unsubstituted $C_1$-$C_{10}$ alkyl, substituted aryl, unsubstituted aryl, substituted heteroaryl, and unsubstituted heteroaryl; at each occurrence, Q is independently a bond or a divalent linking group, and at each occurrence, X is independently —O— or —O—$(CH_2)_n$—O—, wherein n is an integer between 2 and 10.

The polymer is not limited to containing monomers of Formula I, Formula II and Formula III. For example, the polymer may be a copolymer which also contains monomers according to one or more of Formula IV, Formula V, Formula VI, Formula VII, Formula VIII, Formula IX, Formula X, Formula XI, Formula XII, and Formula XIII.

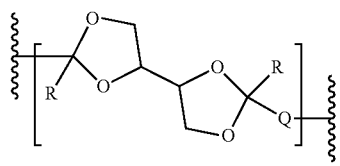

Formula IV

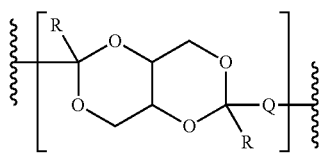

Formula V

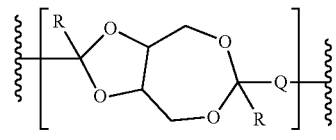

Formula VI

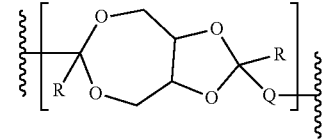

Formula VII

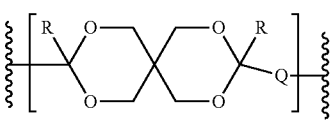

Formula VIII

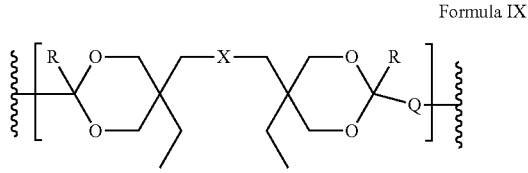

Formula IX

-continued

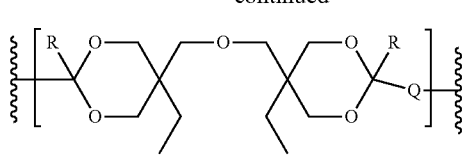
Formula X

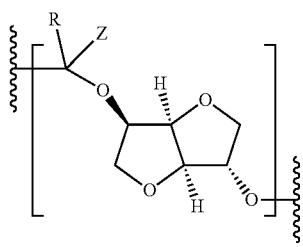
Formula XI

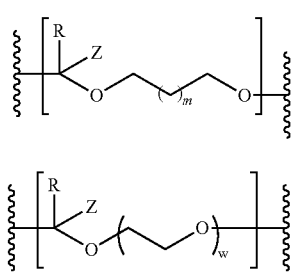
Formula XII

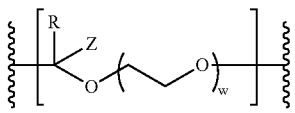
Formula XIII

The present disclosure also provides a reversibly cross-linked polymer containing poly(acetal) monomer units according to one or more of Formula XI, Formula XII and Formula XIII.

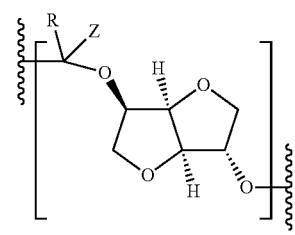
Formula XI

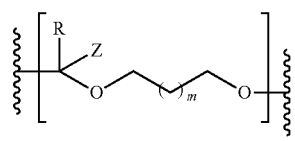
Formula XII

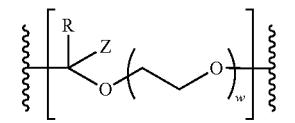
Formula XIII

Each occurrence of R is independently H, substituted $C_1$-$C_{10}$ alkyl, unsubstituted $C_1$-$C_{10}$ alkyl, substituted aryl, unsubstituted aryl, substituted heteroaryl, unsubstituted heteroaryl, substituted arylalkyl, or unsubstituted arylalkyl; each occurrence of m is independently an integer from 3 to 10; each occurrence of w is independently an integer from 2 to 10; each occurrence of Z is independently H, substituted $C_1$-$C_{10}$ alkyl, unsubstituted $C_1$-$C_{10}$ alkyl, substituted aryl, unsubstituted aryl, substituted heteroaryl, unsubstituted heteroaryl, substituted arylalkyl, or unsubstituted arylalkyl, -Q-CHO, -Q-CH(OH)$_2$, -Q-CH(OCH$_3$)$_2$, -Q-CH(OCH$_2$CH$_3$)$_2$, or a divalent -Q- group linked to a further monomer unit; and each occurrence of Q is independently a bond or a divalent linking group. The reversibly crosslinked polymer has the advantage that it can be hydrolyzed under certain conditions, e.g., heat, acid, or both.

The present disclosure further provides a method of preparing a polymer involving mixing a diglycerol with a compound of Formula XIV. The mixture is treated with heat, an acid, or both, to initiate polymerization via acetal formation. The acetal formation generates a solvent byproduct, typically water, which is then removed from the mixture to provide product.

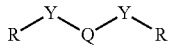
Formula XIV

Each occurrence of Y is independently

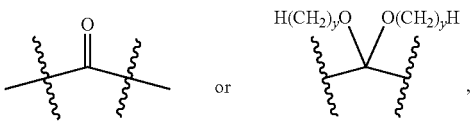

wherein each occurrence of y is independently an integer from 0 to 3; each occurrence of R is independently H, substituted $C_1$-$C_{10}$ alkyl, unsubstituted $C_1$-$C_{10}$ alkyl, substituted aryl, unsubstituted aryl, substituted heteroaryl, unsubstituted heteroaryl, substituted arylalkyl, or unsubstituted arylalkyl; and Q is independently a bond or a divalent linking group.

The vast majority of existing polymer products are derived from non-renewable resources. Glycerol represents a possible renewable, biologically-sourced building block for chemical synthesis. Useful polymers derived from glycerol would be have the double benefit of being sourced from a bio-renewable feedstock and also serving to address the growing excess of glycerol waste produced by industry. Erythritol is a sugar derived from glucose, which is another bio-renewable feedstock that can be used for polyacetal production.

Advantages, some of which are unexpected, are achieved by various embodiments of the present disclosure. In various embodiments, the present invention advantageously provides a robust and flexible poly(acetal) elastomer, which can repeatedly undergo stretching and relaxing without fatigue. Such elastomeric properties were not predictable: for example, one cannot readily predict the mechanical properties of a resulting polymer solely from the chemical structure of one or more components, particularly when such components have never been evaluated in the given polymer system. Additionally, elastomeric poly(acetals) are surprising because the majority of prior described poly(acetals) have provided hard, rigid materials that suffered from low molecular weight.

Various elastomers of the present disclosure have one or more of the advantages of being processable, hydrolysable, degradable, biorenewable, rubber- and latex-free, and environmentally-friendly. Prior elastomers typically are not processable, hydrolysable, or degradable, and involve environmentally-costly non-renewable rubber and latex components. For example, various poly(acetals) can be prepared from crude diglycerol, which is bio-renewable, inexpensive and environmentally-friendly. Crude diglycerol can result in a robust and flexible poly(acetal) material having a more complex architecture than would be expected if purified diglycerol was used. The present disclosure also provides, in various embodiments, a method of synthesizing poly(acetals) for which stability and other properties can be tuned by adjusting the amount and type of components. In various examples, the present method provides poly(acetals) that are elastomeric, whereas prior poly(acetals) typically suffered from being hard and brittle. Advantageously, various methods of the present disclosure can provide poly(acetals) having a higher molecular weight, e.g., above 40,000 kDa, which is higher than achieved by prior poly (acetals). Various methods described herein also advantageously provides poly(acetals) which are stable and amenable to processing.

DETAILED DESCRIPTION OF THE INVENTION

Figure 1:
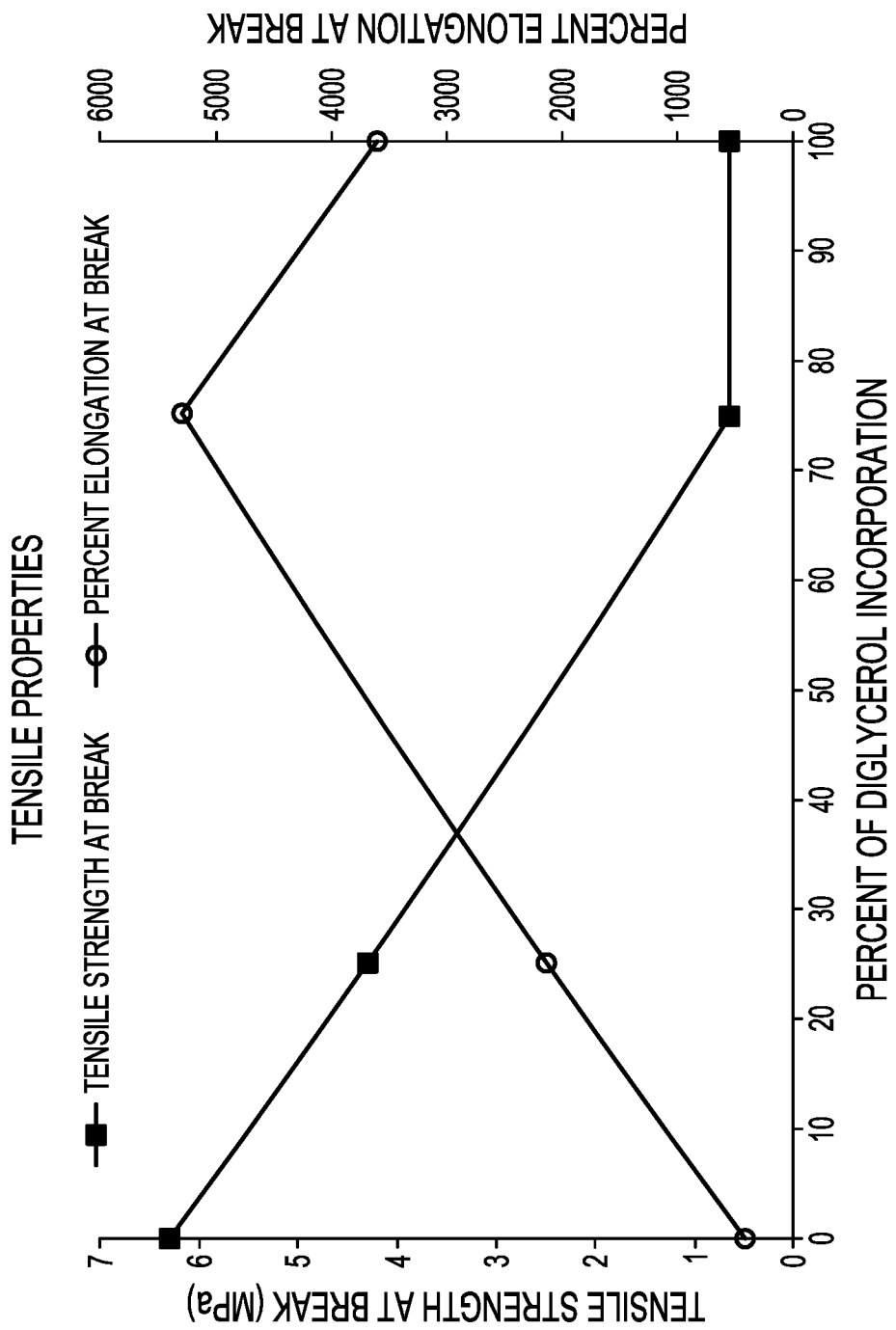
FIG. 1 illustrates tensile strength at break and percent elongation at break versus percent diglycerol in a polyacetal formed from glutaraldehyde with various blends of diglycerol and erythritol (non-diglycerol tetraol), in accordance with various embodiments.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 51%, 60%0, 70%, 80%, 90%, 95%, 96%, 97%, 98%, 99%, 99.5%, 99.9%, 99.99%, or at least about 99.999% or more, or 100%.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O) CH$_2$C(O)R, C(S)R, C(O)OR, OC(O)R, C(O)N(R)$_2$, OC(O) N(R)$_2$, C(S)N(R)$_2$, (CH$_2$)$_{0-2}$N(R)C(O)R, (CH$_2$)$_{0-2}$N(R) N(R)$_2$, N(R)N(R)C(O)R, N(R)N(R)C(O)OR, N(R)N(R) CON(R)$_2$, N(R)SO$_2$R, N(R)SO$_2$N(R)$_2$, N(R)C(O)OR, N(R) C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "organic group" as used herein refers to any carbon-containing functional group. For example, an oxygen-containing group such as an alkoxy group, aryloxy group, arylalkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$ N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, e.g., alkyl, aryl and heteroaryl, and wherein the carbon-based moiety can be substituted or unsubstituted.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups. The term "alkylene" refers to an alkyl group in which one of the hydrogens has been replaced with a bond so as to result in a divalent moiety. For example, an alkylene may be a linear —(CH$_2$)$_x$— group, where X is an integer, e.g., from 1 to 40, 1 to 20, 1 to 12, 1 to 8, 1 to 3, 2 to 10, 3 to 10, 4 to 10, etc. As another example, an alkylene may be a branched or cyclic fully saturated divalent hydrocarbon, such as a divalent cyclohexyl group or 2-methylbutylene.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others. An alkenyl linker refers to a divalent alkenyl moiety.

The term "acyl" as used herein refers to a carbonyl-containing moiety —COR which is linked to the parent substrate via the carbonyl carbon. The carbonyl carbon is directly bonded to an alkyl, alkenyl, alkynyl, aryl, heteroaryl, aralkyl, cycloalkyl, cycloalkylalkyl, heterocyclyl, heterocyclylalkyl, heteroaryl, heteroarylalkyl moiety, or the like. When the carbonyl carbon is bonded with a hydrogen atom, the carbonyl-containing moiety is a "formyl" or an aldehyde. In various embodiments, acyl or formyl groups can, but does not necessarily, include protected forms, namely, acetal and ketal forms. An acyl group can include 0 to about 12, 0 to about 20, or 0 to about 40 additional carbon atoms bonded to the carbonyl group. An acyl group can be substituted or unsubstituted and can include double or triple bonds within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group. An acyl linker refers to a divalent acyl moiety (—COR—) whereas a carbonyl linker refers to a divalent carbonyl moiety (—CO—).

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group. The term "cycloalkylene" refers to a divalent cycloalkyl group.

The term "aryl" as used herein refers to cyclic aromatic hydrocarbon groups that do not contain heteroatoms in the ring. Thus, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof. An aryl group may also take the form of a divalent linking group and includes divalent phenyl and naphthyl groups (e.g., C$_4$H$_6$ and C$_{10}$H$_6$). A divalent phenyl group may be 1,4-substituted, 1,3-substituted or 1,2-substituted.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise, a C$_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups. For example, a dioxolanyl ring and a benzdioxolanyl ring system (methylenedioxyphenyl ring system) are both heterocyclyl groups within the meaning herein. The phrase also includes polycyclic ring systems containing a heteroatom such as, but not limited to, quinuclidyl. Heterocyclyl groups can be unsubstituted, or can be substituted as discussed herein. Heterocyclyl groups include, but are not limited to, pyrrolidinyl, piperidinyl, piperazinyl, morpholinyl, pyrrolyl, pyrazolyl, triazolyl, tetrazolyl, oxazolyl, isoxazolyl, thiazolyl, pyridinyl, thiophenyl, benzothiophenyl, benzofuranyl, dihydrobenzofuranyl, indolyl, dihydroindolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Representative substituted heterocyclyl groups can be mono-substituted or substituted more than once, such as, but not limited to, piperidinyl or quinolinyl groups, which are 2-, 3-, 4-, 5-, or 6-substituted, or disubstituted with groups such as those listed herein.

The term "heteroaryl" as used herein refers to aromatic ring compounds containing 5 or more ring members, of which, one or more is a heteroatom such as, but not limited to, N, O, and S; for instance, heteroaryl rings can have 5 to about 8-12 ring members. A heteroaryl group is a variety of a heterocyclyl group that possesses an aromatic electronic structure. A heteroaryl group designated as a $C_2$-heteroaryl can be a 5-ring with two carbon atoms and three heteroatoms, a 6-ring with two carbon atoms and four heteroatoms and so forth. Likewise, a $C_4$-heteroaryl can be a 5-ring with one heteroatom, a 6-ring with two heteroatoms, and so forth. Heteroaryl groups include, but are not limited to, groups such as furanyl, pyrrolyl, pyrazolyl, triazolyl, tetrazolyl, oxazolyl, isoxazolyl, thiazolyl, pyridinyl, thiophenyl, benzothiophenyl, benzofuranyl, indolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Heteroaryl groups can be unsubstituted or substituted with groups as is discussed herein. Representative substituted heteroaryl groups can be substituted one or more times with groups such as those listed herein.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A "carbocyclic" group refers to a cyclic hydrocarbon group.

The term "acetal" as used herein refers to acetals derived from aldehydes and also acetals derived from ketones, which are also known as ketals. Acetal thus refers to a carbon atom bound to two —OR groups. In cases where the acetal is derived from an aldehyde, the carbon atom is further bound to a hydrogen and another R group. In cases where the acetal is derived from a ketone, the carbon atom is further bound to two R groups. Each R group of an acetal is defined independently and may be the same or different. The R group may be any organic group linked via a carbon atom, including an alkyl, alkenyl, alkynyl, acyl, aryl, cycloalkyl, heterocyclyl, heteroaryl, a haloalkyl, or a hydrocarbyl group. The two —OR groups may be linked so as to form a heterocyclic ring such as a 1,3-dioxolane or a 1,3-dioxane. Commonly, the R group will be an $C_1$-$C_3$ alkyl group such that the R group is a methyl, ethyl or propyl. Depending on context, the term acetal can refer to the functional group itself or it may refer to a compound containing the functional group. Acetal compounds can contain one or more acetal. A functional group which is related to, but distinct from, an acetal is a geminal-diol or hydrate. A geminal-diol, i.e., hydrate, is a carbon atom bound to exactly two —OH groups and further bound to an H and an R or two R groups.

Herein, when it is designated that a variable in the structure can be "a bond," the variable can represent a direct bond between the two groups shown as linked to that variable, such as a single bond.

The polymers described herein can terminate in any suitable way. In some embodiments, the polymers can terminate with an end group that is independently chosen from —H, —OH, $OCH_3$, $OCH_2CH_3$, —CHO, $CH(OH)_2$, $CH(OCH_3)_2$, $CH(OCH_2CH_3)_2$, a glycerol unit, or a diglycerol unit.

The term "solvent" as used herein refers to a liquid that can dissolve a solid, liquid, or gas. Non-limiting examples of solvents are silicones, organic compounds, water, alcohols, ionic liquids, and supercritical fluids.

The term "room temperature" as used herein refers to a temperature of about 15° C. to 28° C.

The term "standard temperature and pressure" as used herein refers to 20° C. and 101 kPa.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n = \Sigma M_i n_i / \Sigma n_i$. The $M_n$ can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "processable" or "thermoplastic" polymer as used herein refers to a polymer which may be molded and reshaped upon heating and cooling. For example, upon heating the polymer may become pliable such that it can be reshaped, or upon heating the polymer may have increased fluidity sufficient to take the form of a mold and upon cooling will at least partially retain the molded shape. The polymer may be flowable when heated and rigid or semi-rigid upon cooling. In various embodiments, the polymer may be repeatedly heated, cooled, and reshaped repeatedly. A "processable" or "thermoplastic" polymer is not a thermoset polymer.

The term "thermoset polymer" as used herein refers to a polymer that can be cured (e.g., irreversibly cross-linked) upon sufficient heating and at which point it becomes more rigid rather than converting to a more fluid state.

Polymers

The present disclosure provides a polymer containing one or more repeating cycloacetal monomer units derived from a diglycerol or an erythritol (e.g., meso-erythritol). The polymer can thus be derived from renewable, bio-sourced glycerol that is produced as a byproduct from biofuel, soap and animal fat rendering industries. In various embodiments, the resulting polymers are processable elastomers that demonstrate rubber-like properties such as stretchiness and reversible deformation. Processable elastomers are sufficiently thermostable such that they can be safely heated without depolymerizing or thermosetting, but upon heating can be reshaped and then subsequently cooled to set and retain the shape.

The polymers described here, in various embodiments, can be hydrolyzed under certain conditions, e.g., under sufficiently acidic conditions, in aqueous solution for sufficiently long periods of time. In various embodiments, the polymer is biodegradable.

The cycloacetal-containing polymers described herein can include monomers having a structure according to at least one of Formula I, Formula II and Formula III.

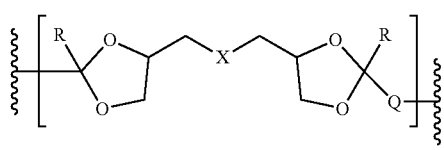

Formula I

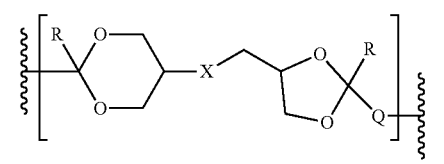

Formula II

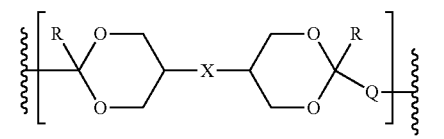

Formula III

In various embodiments, the cycloacetal-containing polymers described herein can include monomers having a structure according to at least one of Formula IV, Formula V, Formula VI and VII.

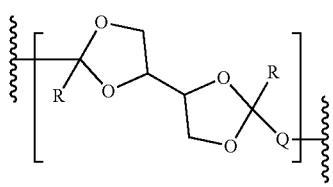

Formula IV

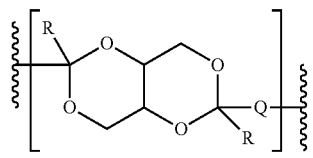

Formula V

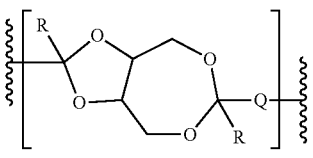

Formula VI

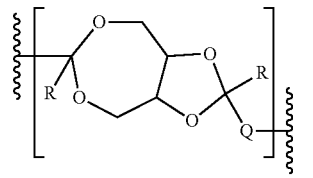

Formula VII

In various further embodiments, the cycloacetal-containing polymers described herein include monomers having a structure according to at least one of Formula I, Formula II and Formula III, or include monomers having a structure according to at least one of Formula IV, Formula V, Formula VI and Formula VII, or include monomers having a structure according to at least one of Formula I, Formula II, Formula III, Formula IV, Formula V, Formula VI and Formula VII.

In yet further embodiments, the cycloacetal-containing polymers described herein include monomers having a structure according to at least one of Formula I, Formula II and Formula III, and also include monomers having a structure according to at least one of Formula IV, Formula V, Formula VI and VII.

The monomer linkages of Formula IV, Formula V, Formula VI and Formula VII can result in a monomer having more rigidity than the monomer linkages of Formula I, Formula II and Formula III.

Each occurrence of R is independently H, Q or any organic group for which the linkage is bound via a carbon-carbon bond to a carbon atom. For example, each occurrence of R may independently be substituted or unsubstituted $C_1$-$C_{10}$ alkyl, substituted or unsubstituted aryl, substituted or unsubstituted heteroaryl. The R groups are each independently selected and may be the same or different. For example, R can be an substituted or unsubstituted methyl, ethyl, propyl, butyl, propyl, hexyl, heptyl, octyl, nonanyl, or decanyl. The R group can be a branched or linear alkyl group. As further examples, R can be substituted or unsubstituted phenyl, naphthyl, furanyl, thiophenyl or pyridinyl. In various embodiments, one or both R groups are H for Formula I, Formula II, Formula III, or any combination thereof. In various embodiments, R can be divalent Q group, e.g., a bond or a alkylene linkage. In another embodiment, two R groups from directly linked neighboring monomer units can be linked so as to form a $C_4$-$C_{10}$ aliphatic carbocyclic ring, together with an occurrence of Q and the carbon atoms to which they attach, e.g., so as to result in a divalent cyclohexane group. In some embodiments, R is a monovalent group (e.g., other than Q).

When at one or more occurrence R in a monomer is Q, then the monomer may be linked to a directly adjacent monomer group via a spirocyclic moiety. In such a case, for example, the divalent linking groups Q, taken together with the carbons to which they are attached, results in a spirocyclic ring. In various embodiments, such spirocyclic ring is a five-membered ring (e.g., each Q is —CH$_2$—) or a six-membered ring (e.g., one Q is —CH$_2$CH$_2$— and two Q are —CH$_2$—). For example, monomers may be linked via a spirocyclic linkage as shown in the following exemplified two-monomer units:

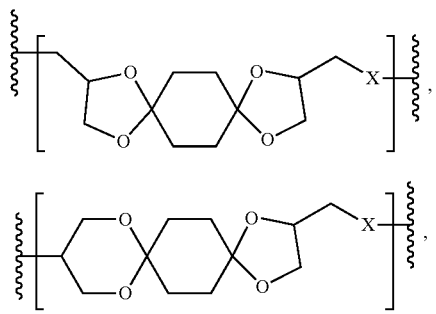

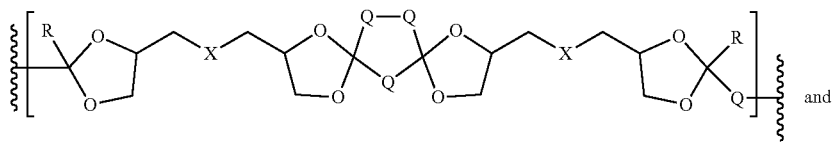

and

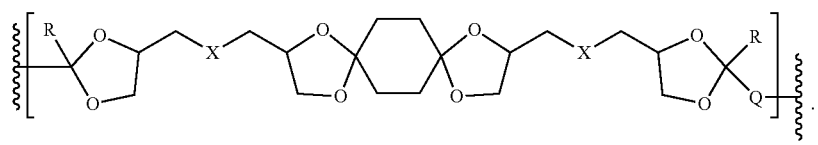

As another example, the present disclosure can be understood as describing polymers having monomers according to one or more of the following structures Formula A, Formula B and Formula C.

Formula A

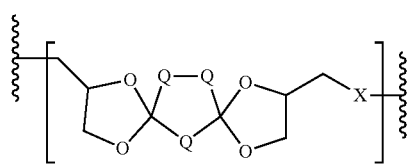

Formula B

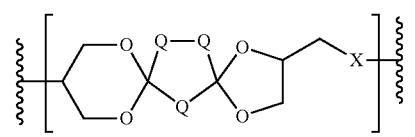

Formula C

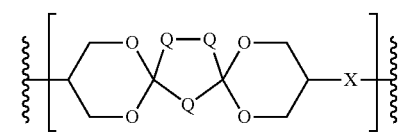

As further examples, the polymers can comprise monomers having one or more of the following structures:

-continued

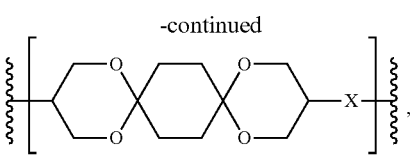

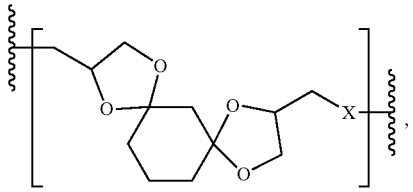

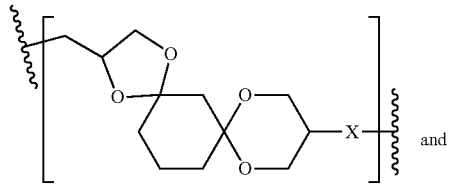

and

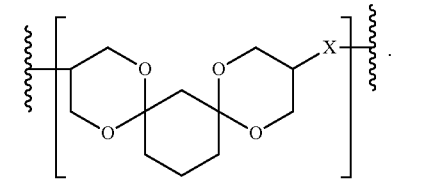

Each occurrence of Q is independently a bond or a divalent linking group. The divalent linking group can be any suitable divalent group. For example, the divalent linking group can be any organic which is divalently linked to its neighboring groups via a carbon atom. Examples include an substituted or unsubstituted divalent $C_1$-$C_{10}$ alkyene or an substituted or unsubstituted divalent aryl group. Non-limiting examples of divalent linking groups include:

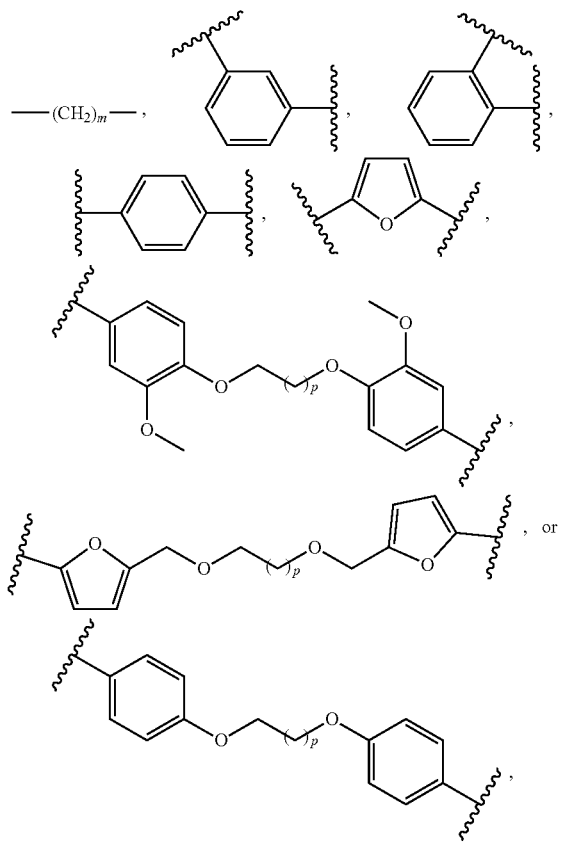

wherein each occurrence of m and p is an integer from 1 to 10.

The divalent linking group can be a divalent methylene, ethylene, propylene, butylene, propylene, hexylene, heptylene, octylene, nonylene, or decylene. The divalent linking group can also be a divalent ethylene glycol oligomer or polymer, e.g., having the structure: —(CH$_2$CH$_2$)—O—(CH$_2$CH$_2$O)$_u$—(CH$_2$CH$_2$)— or —(CH$_2$)—O—(CH$_2$CH$_2$O)$_u$—(CH$_2$)—, wherein u is any integer from 1 to 10.

Each occurrence of X is independently —O— or —O—(CH$_2$)$_n$—O—, wherein n is an integer from 2 to 10. For example, n can be 2, 4, 6, 8 or 10. When X is an oxygen atom, Formula I corresponds to a diglycerol monomer unit derived from diacetalization of α,α-diglycerol, Formula II corresponds to a diglycerol monomer unit derived from diacetalization of α,β-diglycerol, and Formula III corresponds to a diglycerol monomer unit derived from diacetalization of β,β-diglycerol. When X is —O—(CH$_2$)$_n$—O—, Formulas I, II and III correspond a monomer unit containing two glycerol units linked via an alkylene spacer. In another embodiment, X can be —O—(CH$_2$CH$_2$)—O—(CH$_2$CH$_2$O)$_k$—, wherein k is any integer from 0 to 10.

In various embodiments of the polymer, at each occurrence of Formula I, II and III, if present, R is H. In various embodiments of the polymer, at each occurrence of Formula I, II and III, if present, X is O.

The polymer may include, in various embodiments, monomers of one of the three structures according to Formula I, II and III. In other embodiments, the polymer may include monomers according to two of Formula I, II and III. In yet other embodiments, the polymer may include monomers according to all three of Formula I, II and III.

In various embodiments, monomers according to Formula I account for about or at least 5 mol %, 10 mol %, 15 mol %, 20 mol %, 25 mol %, 30 mol %, 35 mol %, 40 mol %, 45 mol %, 50 mol %, 55 mol %, 60 mol %, 65 mol %, 70 mol %, 75 mol %, 80 mol %, 85 mol %, 90 mol %, 95 mol %, or 99 mol % of total monomer. In various embodiments, monomers according to Formula II account for about or at least 5 mol %, 10 mol %, 15 mol %, 20 mol %, 25 mol %, 30 mol %, 35 mol %, 40 mol %, 45 mol %, 50 mol %, 55 mol %, 60 mol %, 65 mol %, 70 mol %, 75 mol %, 80 mol %, 85 mol %, 90 mol %, 95 mol %, or 99 mol % of total monomer. In various embodiments, monomers according to Formula III account for about or at least 5 mol %, 10 mol %, 15 mol %, 20 mol %, 25 mol %, 30 mol %, 35 mol %, 40 mol %, 45 mol %, 50 mol %, 55 mol %, 60 mol %, 65 mol %, 70 mol %, 75 mol %, 80 mol %, 85 mol %, 90 mol %, 95 mol %, or 99 mol % of total monomer.

The polymer can contain a mixture of monomers of Formula I and Formula II and in various embodiments, the mole ratio of such monomers can be a ratio from 2:1 to 20:1. The polymer can contain a mixture of monomers of Formula II and Formula III and in various embodiments, the mole ratio of such monomers can be a ratio from 2:1 to 20:1. The polymer can contain a mixture of monomers of Formula I and Formula III and in various embodiments, the ratio of such monomers can be a ratio any mole ratio from 20:1 to 200:1. As an example, the polymer can contain a ratio of Formula I:Formula II:Formula: III of about 0.84:0.14:0.01

The polymer of the present disclosure can further contain additional monomers beyond those specifically described herein. For example, a person of ordinary skill knows of many monomers which can be polymerized to result in an oligomer which will further link together with diols, dialdehydes, or both, or with the monomers described in Formulas I, II and III. The polymers described herein can be crosslinked or non-crosslinked and they can be copolymers or homopolymers.

In various embodiments, the polymer described herein can contain monomers according to one or more of Formula IV, Formula V, Formula VI, Formula VII, Formula VIII, Formula IX, Formula X, Formula XI, Formula XII, and Formula XIII.

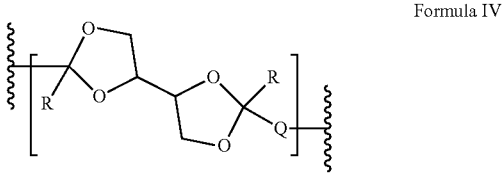

Formula IV

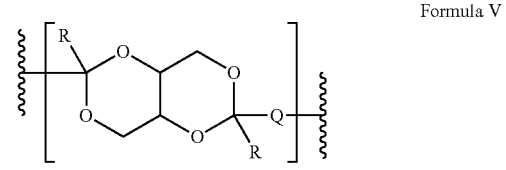

Formula V

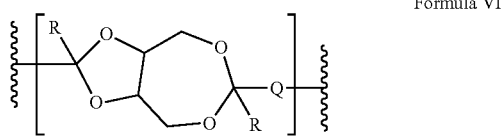

Formula VI

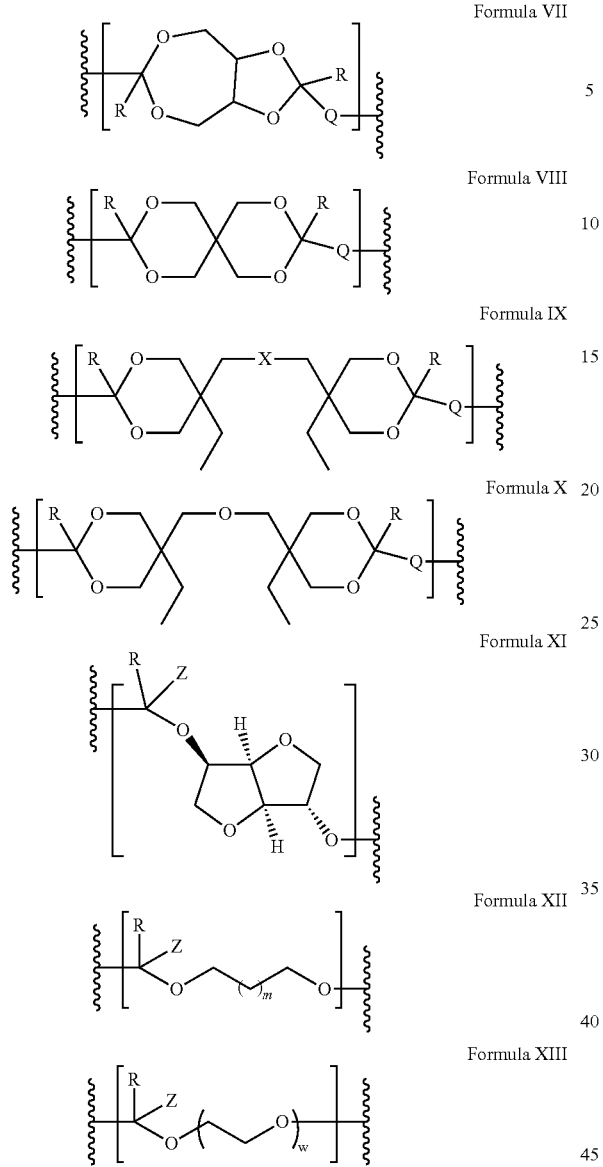

Formula VII
Formula VIII
Formula IX
Formula X
Formula XI
Formula XII
Formula XIII Each occurrence of R, X and Q is independently defined as above.

Each occurrence of Z is independently H, substituted or unsubstituted $C_1$-$C_{10}$ alkyl, substituted or unsubstituted aryl, substituted or unsubstituted heteroaryl, -Q-CHO, -Q-CH(OH)$_2$, -Q-CH(OCH$_3$)$_2$, -Q-CH(OCH$_2$CH)$_2$, or a divalent -Q- group linked to a further monomer unit. The further monomer unit can be, for example, any monomer of Formula I-XIII. When Z is a divalent -Q- group linked to a further monomer, the resulting polymer can be a branched polymer or a crosslinked polymer. In various embodiments, the crosslinked polymer can be a reversibly crosslinked polymer.

In various embodiments, the monomers of Formula I, Formula II, Formula III, Formula IV, Formula V, Formula VI, Formula VII, Formula VIII, Formula IX, and Formula X are each bound to two other monomer units. For example, the polymer may comprise a monomer of Formula I, which in an example embodiment has each of R is Q so that the monomer has four possible linkages (tetravalent), but the monomer is bound to only two other monomer units.

The monomers of Formula XI, Formula XII and Formula XIII can be bound to two or three other monomer units. In various embodiments, when the polymer comprises a monomer of Formula XI, Formula XII or Formula XIII, the monomer may result in crosslinked polymer chains. For example, two separate polymer chains each containing a monomer containing Formula XII can be linked via Z.

Each occurrence of m is independently an integer from 0 to 20, preferably from 3 to 10. In various embodiments, a polymer having monomers according to Formula XII is more easily formed when m is 3 or larger. For example, such polymers can be prepared from an aldehyde, or a ketone, and linear diol having a carbon chain of five carbons or more. A diol having fewer than five carbons may favor formation of cyclic acetals rather than linear chains of monomers. In various embodiments, m can be equal to, or greater than, 0, 1, 2, 3, 4, 5, 6, 7, 8, 9, 10, 11, 12, 13, 14, 15, 16, 17, 18, 19 or 20. Each occurrence of w is independently an integer from 2 to 10.

In various embodiments, the polymers described herein have a number average molecular weight ($M_n$) of 20,000 g/mol or greater. For example, the polymers may have a number average molecular weight ($M_n$) of greater than, or about, 20,500 g/mol, 21,000 g/mol, 22,000 g/mol, 23,000 g/mol, 24,000 g/mol, 25,000 g/mol, 26,000 g/mol, 27,000 g/mol, 28,000 g/mol, 29,000 g/mol, 30,000 g/mol, 31,000 g/mol, 32,000 g/mol, 33,000 g/mol, 34,000 g/mol, 35,000 g/mol, 36,000 g/mol, 37,000 g/mol, 38,000 g/mol, 39,000 g/mol, 40,000 g/mol, 41,000 g/mol, 42,000 g/mol, 43,000 g/mol, 44,000 g/mol, 45,000 g/mol, 46,000 g/mol, 47,000 g/mol, 48,000 g/mol, 49,000 g/mol, 50,000 g/mol, 55,000 g/mol, 60,000 g/mol, 65,000 g/mol, 70,000 g/mol, or greater than, or about 75,000 g/mol. In various embodiments, the $M_n$ may be less than 50,000 g/mol, 60,000 g/mol, 70,000 g/mol, 80,000 g/mol, 90,000 g/mol, 100,000 g/mol, 125,000 g/mol, or less than 150,000 g/mol.

In various embodiments, the polymer comprises one or more of the following structures:

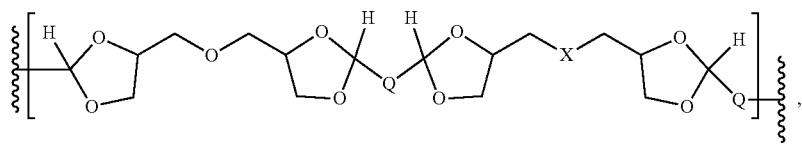

,

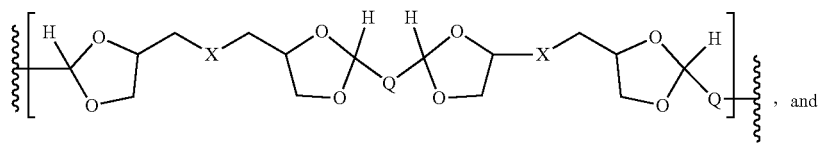

, and

-continued

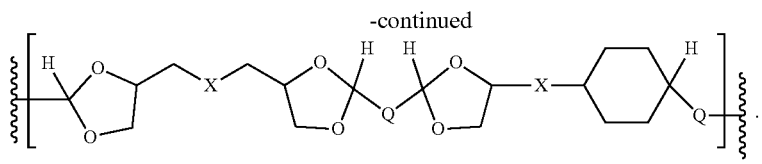

In various examples, the polymer comprises one or more of the following structures:

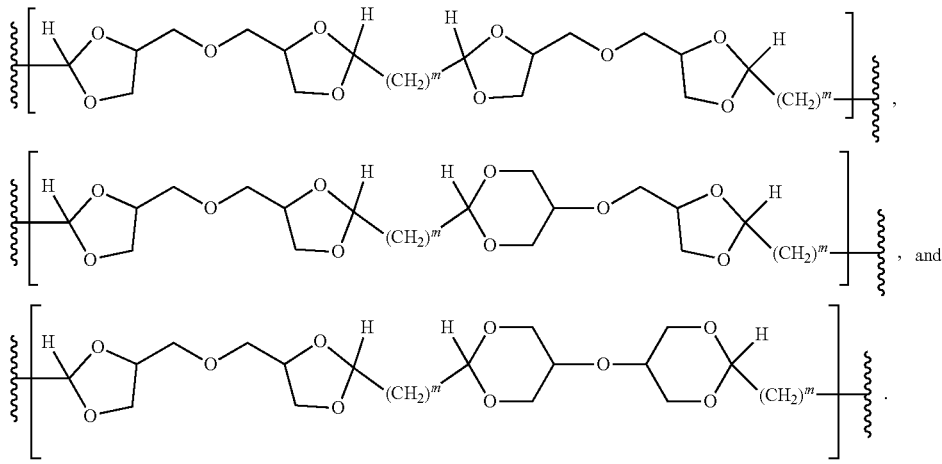

In a further example, the polymer comprises the structure:

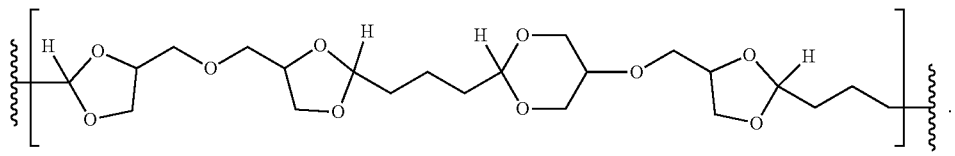

The present disclosure also provides a reversibly crosslinked polymer comprising monomers according to one or more of Formula XI, Formula XII or Formula XIII. Each monomer of Formula XI, Formula XII and Formula XIII is independently a divalent or trivalent monomer.

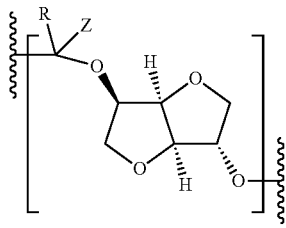

Formula XI

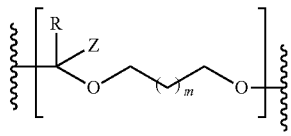

Formula XII

-continued

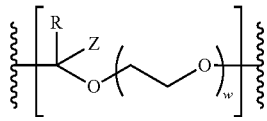

Formula XIII

In various embodiments the reversibly crosslinked polymer contains a diacetal moiety or a monomer derived from a dialdehyde or a tetraalkylacetal.

In various embodiments, the reversibly crosslinked polymer is hydrolysable. The polymer contains crosslinked monomer units, which can have the same structures as Formula XI, Formula XII or Formula XIII or can be based on any other suitable crosslinking structure.

As an example, the polymer comprises a plurality of linear polymer chains each chain having one or more trivalent crosslinking monomer according to Formula XI, Formula XII or Formula XIII at which the linear chains are crosslinked via variable Z. As another example, the polymer can comprise a plurality of linear polymer chains having divalent monomers according to Formula XI, Formula XII or Formula XIII and the linear chains are crosslinked via additional trivalent crosslinking monomers.

Each occurrence of R is independently H, substituted or unsubstituted $C_1$-$C_{10}$ alkyl, substituted or unsubstituted aryl, or substituted or unsubstituted heteroaryl. The R groups are each independently selected and may be the same or different. For example, R can be an substituted or unsubstituted methyl, ethyl, propyl, butyl, propyl, hexyl, heptyl, octyl, nonanyl, or decanyl. The R group can be a branched or linear alkyl group. As further examples, R can be substituted or unsubstituted phenyl, naphthyl, furanyl, thiophenyl or pyridinyl. In various embodiments, one or both R groups are H for Formula I, Formula II, Formula III, or any combination thereof. In some embodiments, two R groups from neighboring monomer units can be linked so as to form a $C_4$-$C_{10}$ aliphatic carbocyclic ring, together with an occurrence of Q and the carbon atoms to which they attach, e.g., so as to result in a divalent cychexane group.

Each occurrence of m is independently an integer from 3 to 10. Each occurrence of Z is independently H, substituted or unsubstituted $C_1$-$C_{10}$ alkyl, substituted or unsubstituted aryl, substituted or unsubstituted heteroaryl, -Q-CHO, -Q-CH(OH)$_2$, -Q-CH(OCH$_3$)$_2$, -Q-CH(OCH$_2$CH$_3$)$_2$, or a divalent -Q- group linked to a further monomer unit. Each occurrence of Q is independently a bond or a divalent linking group.

In various embodiments, Z is Q linked to another monomer so as to form a crosslinked polymer. As an example, the monomer can have the structure of any one of Formulas I-IX. In some embodiments, the monomer has the structure of Formulas I, II or III.

As an example, the polymer comprises the structure:

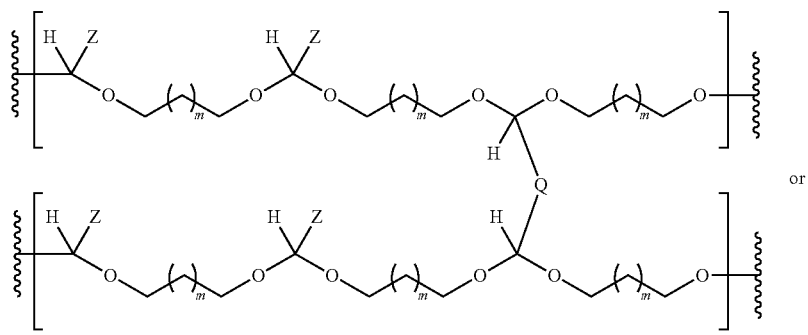

or

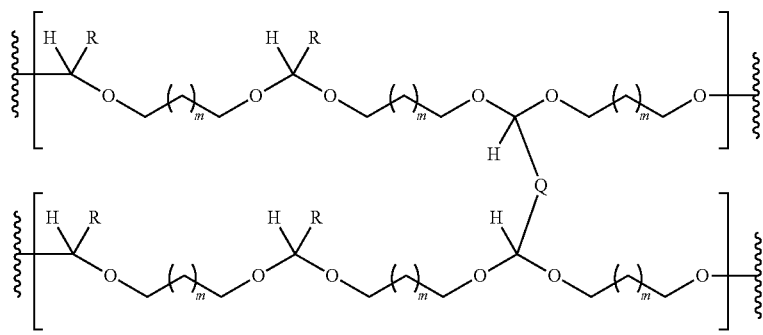

As an example, the polymer comprises the structure:

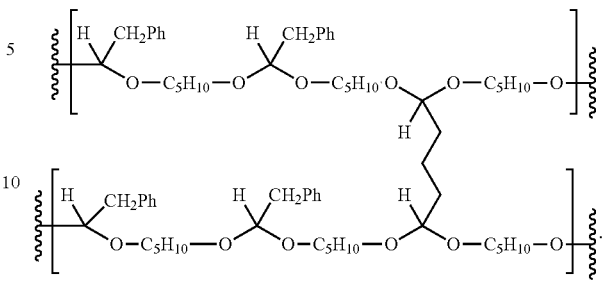

The reversibly crosslinked polymers, in various embodiments, are processable, elastomeric, or both.

The reversibly crosslinked polymers can be hydrolyzed under certain conditions, e.g., under sufficiently acidic conditions or in aqueous solution for a sufficient period of time. Various embodiments of the polymer are stable to pH between 3 and 10, but will hydrolyze under more acidic conditions. In further embodiments, the hydrolysable moiety (e.g., an acetal moiety) is linked to, or part of, the crosslinking structure such that hydrolysis will result in loss of crosslinking. In various further embodiments, the hydrolysable moieties are throughout the polymer such that hydrolysis will result in depolymerization and degradation. In various examples, the reversibly crosslinked polymer is biodegradable.

The poly(acetal) polymers of the present disclosure can have any suitable properties. The properties can be measured as described in the Examples. The poly(acetal) polymers can have an $M_n$ of 8,400-100,000 g/mol, 20,000-80,000 g/mol, 40,000-75,000 g/mol, or 8,400 or more, or less than, equal to, or greater than 9,000, 9,500, 10,000, 12,000, 14,000, 16,000, 18,000, 20,000, 25,000, 30,000, 35,000, 40,000, 45,000, 50,000, 55,000, 60,000, 65,000, 70,000, 80,000, 90,000, or 100,000 g/mol or less. The poly(acetal) polymers can have a $T_g$ of −20 to 50° C., −20 to 20° C., −15 to 0° C., or −20° C. or more, or less than, equal to, or greater than −19, −18, −17, −16, −15, −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, 20, 25, 30, 35, 40, 45° C., or 50 OC or less. The poly(acetal) polymers can have a Young's modulus of 0.01 to 100 MPa, or 0.05 to 90 MPa, or 0.2 to 70 MPa, or 0.01 MPa or more, or less than, equal to, or greater than 0.02, 0.03, 0.04, 0.05, 0.1, 0.2, 0.4, 0.6, 0.8, 1, 2, 3, 4, 5, 6, 8, 10, 12, 14, 16, 18, 20, 25, 30, 35, 40, 45, 50, 55, 60, 65, 70, 80, 90 MPa, or 100 MPa or less. The poly(acetal) polymers can have a tensile strength at break of 0.01 to 20 MPa, or 0.02 to 15 MPa, or 0.1 to 10 MPa, or 1 to 10 MPa, or 0.01 MPa or more, or less than, equal to, or greater than 0.02, 0.04, 0.06, 0.08, 0.1, 0.2, 0.4, 0.6, 0.8, 1, 2, 3, 4, 5, 6, 7, 8, 9, 10, 11, 12, 13, 14, 15, 16, 17, 18, 19, or 20 MPa or less. The poly(acetal) polymers can have an elongation at break of 250 to 15,000%, or 500 to 12,000%, or 1,000 to 10,000%, or 2,000 to 10,000%, or 250% or more, or less than, equal to, or greater than 300%, 400, 500, 600, 800, 1,000, 2,000, 3,000, 4,000, 5,000, 6,000, 7,000, 8,000, 9,000, 10,000, 12,000, 14,000, or 15,000% or less.

Various aspects provide a composition that includes the poly(acetal) polymer that has one or more improved properties relative to the poly(acetal) polymer in isolation. Such compositions include one or more components in addition to the poly(acetal) polymer, such as silica, carbon black, clay, other polymers, or a combination thereof. In some aspects, the composition can include polybutylene succinate, which can improve the elasticity relative to the poly(acetal) polymer in isolation. The one or more additives can be about 0.001 wt % to about 50 wt % of the composition, or 0.001 wt % to 20 wt %, or 0.001 wt % or more, or less than, equal to, or greater than 0.01 wt %, 0.1, 1, 2, 3, 4, 5, 6, 8, 10, 12, 14, 16, 18, 20, 25, 30, 40 wt %, or about 50 wt % or less.

Preparation of Polymers

The present disclosure also provides a method of preparing a poly(acetal) polymer from a diglycerol and a dicarbonyl compound. The method involves mixing the diglycerol and dicarbonyl compound, which may be mixed neat, in organic solvent, in aqueous solvent, or in mixture of organic and aqueous solvent. For example, some dicarbonyl compounds are commercially available as an aqueous solution. Polymerization proceeds via cycloacetal formation. Cycloacetalization can be induced by treating the mixture with heat, an acid, or both. Acetal formation involves loss of a solvent byproduct, namely, water from the dicarbonyl compound, or alcohol if the dicarbonyl compound was in an alcohol-protected form. Acetal formation is generally a reversible process. The reaction equilibrium can be shifted toward product formation by removing the solvent byproduct, e.g., water or alcohol, that is produced during acetalization. Water and solvent can be removed via one or more of azeotropic distillation, use of a Dean-Stark apparatus, and use of physical drying agents. In various examples, the molecular weight of product can be increased by prompt removal of solvent byproduct. The present disclosure also provides a method of poly(acetal) polymer from a erythritol and a dicarbonyl compound, the method involving steps substantially similar to those above except the diglyercol is replaced, or mixed, with erythritol.

The dicarbonyl compound may be a dialdehyde, a diketone, or a compound which contains one aldehyde and one ketone.

Non-limiting examples of suitable dialdehydes include glyoxal, malonaldehyde (propanedialdehyde), succinaldehyde (butanedialdehyde), glutaraldehyde (pentanedialdehyde), adipaldehyde (hexanedialdehyde), heptanedialdehyde, octanedialdehyde, nonanedialdehyde, decanedialdehyde, o-phthalaldehyde, m-phthalaldehyde, p-phthalaldehyde, maleic dialdehyde, fumaric dialdehyde, glutaconic dialdehyde, muconic dialdehyde, citraconic dialdehyde, mesaconic dialdehyde, itaconic dialdehyde, diphenaldehyde and naphthalenedialdehyde. The dialdehyde can be isolated (neat) or in solution, e.g., an aqueous solution.

Non-limiting examples of suitable diketones include 2,3-butanedione, 2,4-pentanedione, 2,5-hexanedione, 2,6-heptanedione, 2,7-octanedione, 2,8-nonanedione, 2,9-decanedione, 2,4-hexanedione, 2,4-heptanedione, 2,4-octanedione, 2,4-nonanedione, 2,4-decanedione, cyclobutene-1,3-dione, cyclopentane-1,3-dione, cyclohexane-1,3-dione, cyclohexane-1,4-dione, 1-phenyl-1,2-propanedione, 1-phenyl-1,2-butanedione, 1-phenyl-1,3-butanedione, 1-phenyl-1,4-pentanedione and 1,3-diphenyl-1,3-propanedione.

Suitable dicarbonyl compounds can also be synthesized, e.g., by installing readily available starting aldehyde-containing building blocks onto the terminal ends of a divalent linker. For example, two equivalents of a compound that contains an aldehyde and a nucleophilic alcohol group (e.g., vanillin or hydroxymethylfurfural) can be treated with an α,ω-dibromoalkane of the desired length or any other linking group containing two terminal carbons receptive to nucleophilic substitution by oxygen.

Dicarbonyl compounds also include acetal-protected forms thereof. For example, dicarbonyl compounds can include a latent dialdehyde or diketone in the form of a bis(dimethyl acetal), a bis(diethyl acetal) or a bis(1,3-dioxolane) of any of the above-listed dialdehydes and diketones. Specific non-limiting examples of protected dicarbonyl compounds include malonaldehyde bis(dimethylacetal), succinaldehyde bis(dimethyl acetal), glutaraldehyde bis(dimethyl acetal), adipaldehyde bis(dimethyl acetal). In various embodiments, the dicarbonyl compound may be generated in situ from corresponding acetal-protected forms. Use of protected forms can have the advantage, in various embodiments, of expelling a solvent byproduct that is more volatile than water, e.g., methanol or ethanol, which can result in improved yields and/or products having higher molecular weights. In various examples, the molecular weight of product can be increased by prompt removal of solvent byproduct.

In various embodiments, the dicarbonyl compound may be described according to the structure of Formula XIV.

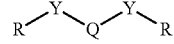

Formula XIV

Each occurrence of Y is independently

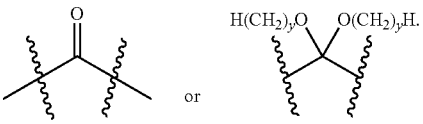

Each occurrence of y is independently an integer from 0 to 10, preferably an integer from 1 to 3.

Each occurrence of R is independently H, substituted or unsubstituted $C_1$-$C_{10}$ alkyl, substituted or unsubstituted aryl, or substituted or unsubstituted heteroaryl. The R groups are each independently selected and may be the same or different. For example, R can be an substituted or unsubstituted methyl, ethyl, propyl, butyl, propyl, hexyl, heptyl, octyl, nonanyl, or decanyl. The R group can be a branched or linear alkyl group. As further examples, R can be substituted or unsubstituted phenyl, naphthyl, furanyl, thiophenyl or pyridinyl. In various embodiments, one or both R groups are H for Formula I, Formula II, Formula III, or any combination thereof. In some embodiments, two R groups from neighboring monomer units can be linked so as to form a $C_4$-$C_{10}$ aliphatic carbocyclic ring, together with an occurrence of Q and the carbon atoms to which they attach, e.g., so as to result in a divalent cycohexane group.

Each occurrence of Q is independently a bond or a divalent linking group. The divalent linking group can be any suitable divalent group. For example, the divalent linking group can be any organic which is divalently linked to its neighboring groups via a carbon atom. Examples include an substituted or unsubstituted divalent $C_1$-$C_{10}$ alkyene or an substituted or unsubstituted divalent aryl group. Non-limiting examples of divalent linking groups include:

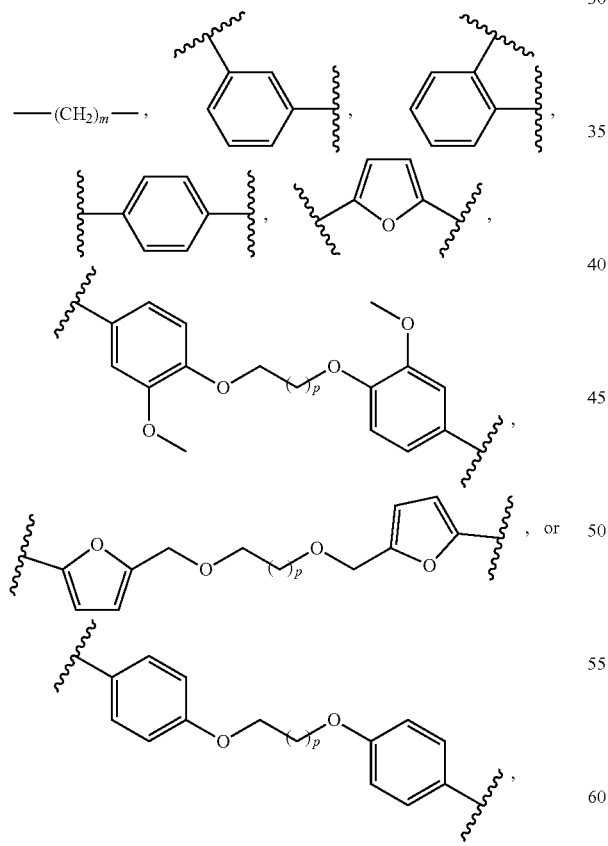

wherein each occurrence of m and p is an integer from 1 to 10.

The divalent linking group can be a divalent methylene, ethylene, propylene, butylene, propylene, hexylene, heptylene, octylene, nonylene, or decylene. The divalent linking group can also be a divalent ethylene glycol oligomer or polymer, e.g., having the structure: —($CH_2CH_2$)—O—($CH_2CH_2O$)$_u$—($CH_2CH_2$)— or —($CH_2$)—O—($CH_2CH_2$O)$_u$—($CH_2$)—, wherein u is any integer from 1 to 10.

The reaction mixture may further contain additional compounds including aldehydes, diols and tetraols suitable to result in a copolymer product.

Non-limiting examples of suitable aldehydes include substituted or unsubstituted $C_1$-$C_{10}$ aliphatic aldehydes, such as phenylacetaldehyde and pyruvic aldehyde, and substituted or unsubstituted aromatic aldehydes, such as benzaldehyde and furfural. Suitable aldehydes may also be in acetal protected form, e.g., as phenylacetaldehyde dimethyl acetal and pyruvic aldehyde dimethyl acetal.

Non-limiting examples of suitable diols include isosorbide and diols having the structure

where m is an integer from 0 to 20, preferably from 3 to 10. In various embodiments, a polymer having monomers according to Formula XII is more easily formed when m is 3 or larger. For example, such polymers can be prepared from an aldehyde, or a ketone, and linear diol having a carbon chain of five carbons or more. A diol having fewer than five carbons may favor formation of cyclic acetals rather than linear chains of monomers. In various embodiments, m can be equal to, or greater than, 0, 1, 2, 3, 4, 5, 6, 7, 8, 9, 10, 11, 12, 13, 14, 15, 16, 17, 18, 19 or 20.

Non-limiting examples of suitable tetraols include pentaerythritol, erythritol, di-trimethylolpropane. The polymer can be formed from a mixture of diglycerol and one or more tetraols, wherein the mole ratio of the diglycerol to the one or more tetraols (e.g., pentaerythritol, erythritol, or a combination thereof) is 0:100 to 100:0, or 10:90 to 90:10, or 40:60 to 95:5, 50:50 to 90:10, or 0:100, or less than, equal to, or greater than 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, or 100:0 or less.

In various embodiments, the diglycerol compound may be a crude mixture of diglycerol or a purified diglycerol. For example, the diglycerol may be α,α-diglycerol, α,β-diglycerol, β,β-diglycerol, or a mixture of any combination thereof.

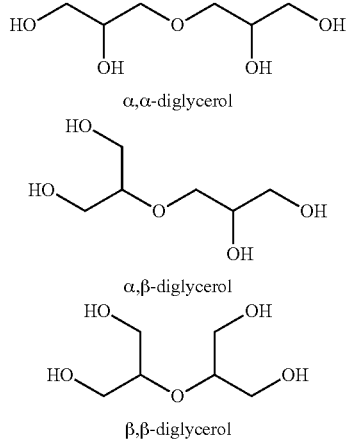

Further examples of diglycerol compounds include compounds having two glycerol moieties linked via a divalent linker X. The divalent group X can be, e.g., —O—(CH$_2$)$_n$—O—, wherein n is an integer from 2 to 10, or —O—(CH$_2$CH$_2$)—O—(CH$_2$CH$_2$O)$_k$—, wherein k is any integer from 0 to 10. Such compounds can be prepared by treating commercially available solketal (i.e., a partially protected glycerol) with a suitable base and an α,ω-dibromoalkane of the desired length or any other linking group containing two terminal carbons receptive to nucleophilic substitution by oxygen.

In various embodiments, the diglycerol compounds are used in unpurified form. In various other examples, the diglycerol compounds are used in protected form, e.g., as an acetal, a cycloacetal, an aldehyde-derived acetal, an aldehyde-derived cycloacetal, a ketal or a cycloketal.

The present disclosure also provides a method of preparing a poly(acetal) polymer from a diol and an aldehyde or ketone. The method involves mixing the diol and the aldehyde or ketone, which may be mixed neat, in organic solvent, in aqueous solvent, or in mixture of organic and aqueous solvent. Polymerization proceeds via non-cyclic acetal formation in which the diol joins two aldehyde or ketone monomers. Non-cyclic acetalization can be favored by use of a diol having 5 or more carbons. Acetalization is further induced by treating the mixture with heat, an acid, or both. Acetal formation involves loss of a solvent byproduct, namely, water from the aldehyde or ketone compound, or alcohol if the aldehyde or ketone was in acetal-protected form. Acetal formation is generally a reversible process. The reaction equilibrium can be shifted toward product formation by removing the solvent byproduct, e.g., water or alcohol, that is produced during acetalization. Water and solvent can be removed via one or more of azeotropic distillation, use of a Dean-Stark apparatus, and use of physical drying agents. In various examples, the molecular weight of product can be increased by prompt removal of solvent byproduct.

In various embodiments, the diol is isosorbide, a linear PEG chain, or a linear α,ω-alkanediol. For example, the linear alkanediol can have the structure

where m is an integer from 0 to 20, preferably from 3 to 10. In various embodiments, a polymer having monomers according to Formula XII is more easily formed when m is 3 or larger. For example, such polymers can be prepared from an aldehyde, or a ketone, and linear diol having a carbon chain of five carbons or more. A diol having fewer than five carbons may favor formation of cyclic acetals rather than linear chains of monomers. In various embodiments, m can be equal to, or greater than, 0, 1, 2, 3, 4, 5, 6, 7, 8, 9, 10, 11, 12, 13, 14, 15, 16, 17, 18, 19 or 20.

Various methods of the present disclosure can involve use of heat. The heat may be involved in inducing polymerization or may be involved in solvent byproduct removal or may be involved in both. Suitable temperatures can be readily determined based on the boiling points of the solvents initially present in the reaction mixture, or based on the solvent byproduct produce during reaction, or both. For example, the reaction mixture can be heated to a temperature at or below the boiling point of a given solvent. In various embodiments, the reaction mixture is heated to reflux.

Various methods of the present disclosure can involve use of an acid. Suitable acids can be readily determined by a person of ordinary skill in the art in view of the present disclosure. Non-limiting examples of suitable acids include organic acids such as p-toluenesulfonic acid and inorganic acids such as sulfuric acid and hydrochloric acid. In various embodiments, the acid is used in a catalytic amount, e.g., 5 mol %.

Various methods of the present disclosure can involve use of a solvent. Suitable solvents can be readily determined by a person of ordinary skill in the art in view of the present disclosure. Non-limiting examples of suitable solvents include ethyl acetate, dichloromethane, 2-methyltetrahydrofuran, water, toluene, and petroleum ether. Solvent may be added initially, after a period of time, after a period of heating, and/or in one or more steps.

In various embodiments of the methods, the polymer is prepared substantially in the absence of acetone. For example, acetone is not used as a solvent. As another example, acetone-protected diglycerols (i.e., acetonides) are not used as reagents. For example, the presence of acetone can result in a polymer having divalent —C(CH$_3$)$_2$O— units, and such units could render a polymer more vulnerable to hydrolysis or result in lower molecular weights than desired. In various embodiments of the methods, the polymer is prepared substantially in the absence of ketones.

Various methods of the present disclosure can involve use of physical drying agents. Suitable physical drying agents include dehydrated inorganic salts such as calcium chloride, calcium sulfate, magnesium sulfate, potassium carbonate and sodium sulfate, and microporous aluminosilicates such as molecular sieves. Suitable molecular sieves include those having pore sizes of e.g., 3, 4 or 5 angstroms. In various embodiments, the solvent by product is water, methanol, ethanol, or a mixture thereof.

In various embodiments of the methods, the polymer is prepared in the presence of an amine. In some embodiments the amine may be keep in contact with the resulted polymer and in other embodiments the amine is removed. The amine may be added to once reaction has sufficiently proceeded to completion so as to neutralize the acid catalyst. The amine can be any common amine; for example, the amine may be triethylamine or triethanolamine. The amine can have the advantageous effect of reducing hydrolysis of the resulting polymer by atmospheric water. In various aspects, neutralizing the acid with triethanolamine can better stabilize the materials, and can provide a polymer having a higher number average molecular weight and higher tensile strength, as compared to neutralizing the acid with triethylamine.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

EXAMPLES

Various embodiments of the present invention can be better understood by reference to the following Examples which are offered by way of illustration. The present invention is not limited to the Examples given herein.

All chemicals were purchased from Fisher Scientific (Hampton, N.H.) and used as received without further purification. Glutaraldehyde is supplied as a 50% aqueous solution and glyoxal as a 40% aqueous solution. 4 Å molecular sieves were dried under dynamic vacuum at 160° C. for 18 h, and then stored in a desiccator until use.

Thermogravimetric analysis (TGA) and differential scanning calorimetry (DSC) analyses were conducted under inert high purity nitrogen gas. TGA analyses were performed on a TA (New Castle, Del.) Q50 system by heating samples (10-20 mg) on platinum pans to 500° C. at 25° C./min. Data were analyzed using Universal Analysis software to determine the temperature of 5% mass loss. DSC analyses were performed on a TA (New Castle, Del.) Q20 system by heating samples (5-10 mg) in Tzero pans sealed with Tzero hermetic lids. Samples were heated at 10° C./min to 250° C. or a temperature of 95% mass retention (as determined by TGA analysis), held isothermally for 2 min, cooled to −50° C. at 10° C./min with liquid nitrogen, held isothermally for 2 min, and then reheated to 250° C. or a temperature of 95% mass retention at 10° C./min. The final heating cycle was used to determine the glass transition temperature (Tg). Data were analyzed using Universal Analysis software.

A GPC system [Waters 1515 Isocratic high-performance liquid chromatography (HPLC) Pump, Waters Styragel HR 1, 3, 4, and 5 columns, Milford, Mass.] with a refractive index detector (Waters 2414) was used to determine the molecular weight and molecular weight dispersity of the polyacetal samples. N,N-Dimethylformamide (for HPLC, 99.90/%, Fisher Scientific, Hampton, N.H.) with 0.01 M LiCl was used as the eluent (1.0 mL/min) at 30° C. Samples (approximately 1 mg/mL) were chromatographed at a rate of 1 mL/min. Polystyrene standards (Polymer Standards Service) were used to generate the calibration curve.

Tensile testing was performed at room temperature using an Instron 5969 unit (Norwood, Mass.) equipped with a 100 N load cell. Testing methods were developed on the software Bluehill 3. Samples were dried for at least 24 h in a vacuum oven at approximately 60° C. prior to analyses. Subsequently, polymers were placed between layers of parchment paper and flattened using a heated press (set to 200° C.) to a thickness of 2-4 mm. Specimens for tensile testing were then produced through the use of an Ace Steel Rule Die conforming to the ASTM D-638V standard. Samples were stretched to failure at a rate of 120 mm/min. For hysteresis experiments, samples were prepared as described above. All samples were subjected to 20 cycles of stretching at 5 mm/min with no recovery between cycles. Most samples were stretched to 5 mm (53%) strain prior to recovery. However, samples prepared from 75 and 100% meso-erythritol were stretched to 3 mm (32%) and 2 mm (21%), respectively, due to behavior consistent with some level of polymer yielding at 50% strain.

Example 1. Polymerization of a Vanillin-Based Dialdehyde 1 and Diglycerol

A vessel was charged with the vanillin-based dialdehyde 1, diglycerol, toluene and a catalytic amount of p-TsOH. Dialdehyde 1 had the following structure:

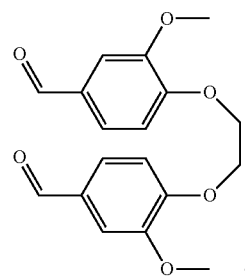

The vessel was fitted with a Dean-Stark apparatus and the mixture was azeotropically distilled for 24 h. After 24 h, the Dean-Stark showed an accumulation of water, which was removed. Molecular sieves were added to the system to remove additional water and distillation was continued for another 24 h. The solution was subsequently worked up and an amber solid was isolated then dried in vacuo. The resulting solid was hard, brittle, and showed a number average molecular weight (Mn) of 20,500 g/mol thus confirming copolymerization of diglycerol.

Example 2. Polymerization of Glutaraldehyde and Diglycerol

A vessel was charged with an aqueous solution of glutaraldehyde and diglycerol. Materials were used without purification. The mixture was first heated to 50-60° C. to initiate polymerization, and then heated to reflux to remove water from the system. These conditions resulted in a strong, elastic material having a number average molecular weight (Mn) of 35,000-75,000 g/mol.

Example 3. Polymerization of Glyoxal and Diglycerol

Example 3 was conducted similarly to Example 2 except that glyoxal was substituted for glutaraldehyde. The resulting material was robust and flexible. Molecular weight, PDI, and $T_g$ were not determined due to poor solubility.

Example 4. Polymerization of Glutaraldehyde and α,α-Diglycerol

Example 4 can be conducted similarly to Example 2, except that purified α,α-diglycerol is used instead of unpurified diglycerol (which contains a mixture α,α-diglycerol, α,β-diglycerol and β,β-diglycerol). The resulting material is expected to be flexible and strong, but show less structural complexity than the material of Example 2.

Purified α,α-diglycerol can be obtained by (1) forming the dicarbonate of unpurified diglycerol, e.g., by use of dimethyl carbonate and $K_2CO_3$, (2) crystallizing and purifying the resulting dicarbonates, then (3) hydrolyzing the purified decarbonate back to diglycerol, e.g., by use of methanol, water and $K_2CO_3$.

Similar examples can be conducted with other dialdehydes or other forms of diglycerol.

Example 5. Polymerization of Malonaldehyde Bis(Dimethyl Acetal) and Diglycerol

A vessel was charged with malonaldehyde bis(dimethyl acetal) and diglycerol which readily reacted to provide a hard but flexible material.

Example 6. Polymerization of Glutaraldehyde and Diglycerol with Triethylamine A vessel was charged with glutaraldehyde and diglycerol. The mixture was heated and treated with p-TsOH to initiate polymerization, then heated to reflux to remove water from the system. The p-TsOH was subsequently neutralized with triethylamine. These conditions resulted in a strong, elastic material having a number average molecular weight ($M_n$) of 38,000 g/mol and having a tensile strength of 0.0351 MPa.

Example 7. Polymerization of Various Aldehydes and Ketones with Diglycerol Using Triethanolamine for Quench A vessel was charged with glutaraldehyde and diglycerol. The mixture was heated and treated with p-TsOH to initiate polymerization, then heated to reflux to remove water from the system. The p-TsOH was subsequently neutralized with triethanolamine. These conditions resulted in a strong, elastic material having a number average molecular weight ($M_n$) of 70,000 g/mol and having a tensile strength of 0.0424 MPa. Quenching the acid with triethanolamine resulted in a polymer having a higher number average molecular weight and higher tensile strength than quenching it with triethylamine.

The procedure with diglycerol using a triethanolamine quench was repeated using various aldehydes and ketones, with the properties of the resulting product shown in Table 1. Molecular weight, PDI, and $T_g$ were not determined for the product resulting from glyoxal due to poor solubility.

TABLE 1

Polymerization of various aldehydes and ketones with diglycerol using triethanolamine for quench.

| Aldehyde/ketone | Mn (g/mol) | PDI | Tg (° C.) |
|---|---|---|---|
| Glyoxal | Not determined | Not determined | Not determined |
| Glutaraldehyde | 60,800 | 3.6 | −11.6 |
| 1,3-cyclohexanedione | 8,400 | 1.2 | −3.0 |
| 1,4-cyclohexanedione | 24,700 | 1.8 | 14.3 |
| Terephthaldehyde | 15,600 | 1.6 | 16.4 |
| Divanilin (aldehyde 1) | 26,700 | 1.3 | 40.1 |

Example 8. Polymerization of Glutaraldehyde and a Blend of Diglycerol with Erythritol A vessel was charged with glutaraldehyde and various blends of diglycerol and erythritol. The mixture was heated and treated with p-TsOH to initiate polymerization and water was removed from the system. Use of a blend of diglycerol and erythritol permitted control over tensile properties. An increase in the proportion of erythritol (non-diglycerol tetraol) results in a polyacetal having increased tensile strength and a lower percentage elongation at break. An increase in the proportion of diglycerol results in polyacetal having increased elongation and lower strength at break. See, FIG. 1, which illustrates the effect on tensile properties based on the proportion of tetraol which is diglyercol.

Example 9. Polymerization of Glutaraldehyde and Diglycerol with Pentaerythritol A vessel was charged with glutaraldehyde and various blends of diglycerol and pentaerythritol. The mixture was heated and treated with p-TsOH to initiate polymerization and water was removed from the system. Use of a blend of diglycerol and pentaerythritol permitted control over tensile properties. An increase in the proportion of pentaerythritol (non-diglycerol tetraol) results in a polyacetal having increased tensile strength and a lower percentage elongation at break. An increase in the proportion of diglycerol results in polyacetal having increased elongation and lower strength at break. See, FIG. 1, which illustrates the effect on tensile properties based on the proportion of tetraol which is diglyercol. FIG. 1 shows that an increase in the proportion of erythritol resulted in a polyacetal having increased tensile strength and a lower percentage elongation at break, while an increase in the proportion of diglycerol resulted in polyacetal having increased elongation and lower strength at break.

We observed an increase in tensile strength at break when pentaerythritol is blended in with diglycerol in the present Example instead of erythritol in Example 8. When the mole ratio is 75:25 diglycerol:erythritol, the tensile strength at break was 0.627 MPa whereas 75:25 diglycerol:pentaerythritol yielded a tensile strength at break of 1.57 MPa with a reduced % elongation (5300 vs 3100). Without being limited by theory, this increase in strength may be attributed to the rigid spirocenters shown in Formula VIII.

Shortening the length of the alkyl spacer between the aldehydes will show reduced flexibility of the polymer backbone, as will switching to diketones or cyclics. Blends of more rigid polymers with more elastomeric polymers will impact tensile properties. These factors will provide an ability to adjust material properties for various potential applications ranging from elastomers to tough, durable polymers.

Example 10. Further Studies on Polymerization of Glutaraldehyde and Diglycerol with Pentaerythritol The procedure of Example 9 was repeated using various proportions of diglycerol to erythritol or pentaerythritol. Glutaraldehyde (150 mmol), tetraol (150 mmol total), and p-TsOH (1.5 mmol) were refluxed in toluene in a Dean-Stark apparatus for 48 h. Molecular sieves were added to the Dean-Stark trap after 24 h and reactions were quenched using triethanolamine (3.0 mmol). The properties of the polycycloacetals formed are reported in Table 2. Reported values are an average of at least three separate syntheses and characterizations. $M_n$ was determined by GPC versus polystyrene standards. Td was determined by TGA. $T_g$ was determined by DSC. Young's modulus, tensile strength at break, and elongation at break were determined by tensile testing dog bone specimens using an Instron at a rate of 120 mm/min. Tensile strength at break for the 100:0 and the 75:25 diglycerol:erythritol samples was the tensile strength at yield.

TABLE 2

Properties of polycycloacetals formed by polymerizing glutaraldehyde with various mole ratios of diglycerol to erythritol.

| Mol %<br>Diglycerol | Mol %<br>Erythritol | $M_n$<br>(g/mol) | PDI | Yield<br>(%) | $T_d$<br>(95%,<br>° C.) | $T_g$<br>(° C.) | Young's<br>Modulus<br>(MPa) | Tensile<br>Strength<br>at Break<br>(MPa) | Elongation<br>at Break<br>(%) |
|---|---|---|---|---|---|---|---|---|---|
| 100 | 0 | 60,800 | 3.6 | 85 | 324 | −11.6 | 0.079 | 0.25 | 5,300 |
| 75 | 25 | 65,000 | 3.6 | 87 | 324 | −6.1 | 0.27 | 0.10 | 7,400 |
| 50 | 50 | 64,200 | 3.6 | 95 | 320 | 0.5 | 0.28 | 0.85 | 3,000 |
| 25 | 75 | 55,600 | 3.6 | 81 | 319 | 10.9 | 19.4 | 6.2 | 840 |
| 0 | 100 | 44,300 | 2.0 | 88 | 318 | 11.4 | 62.5 | 7.1 | 500 |
| 75 | 25* | 57,000 | 2.8 | 78 | 327 | 0.0 | 0.64 | 1.7 | 2,200 |

*In the last sample, pentaerythritol was used instead of erythritol.

Figure 2:
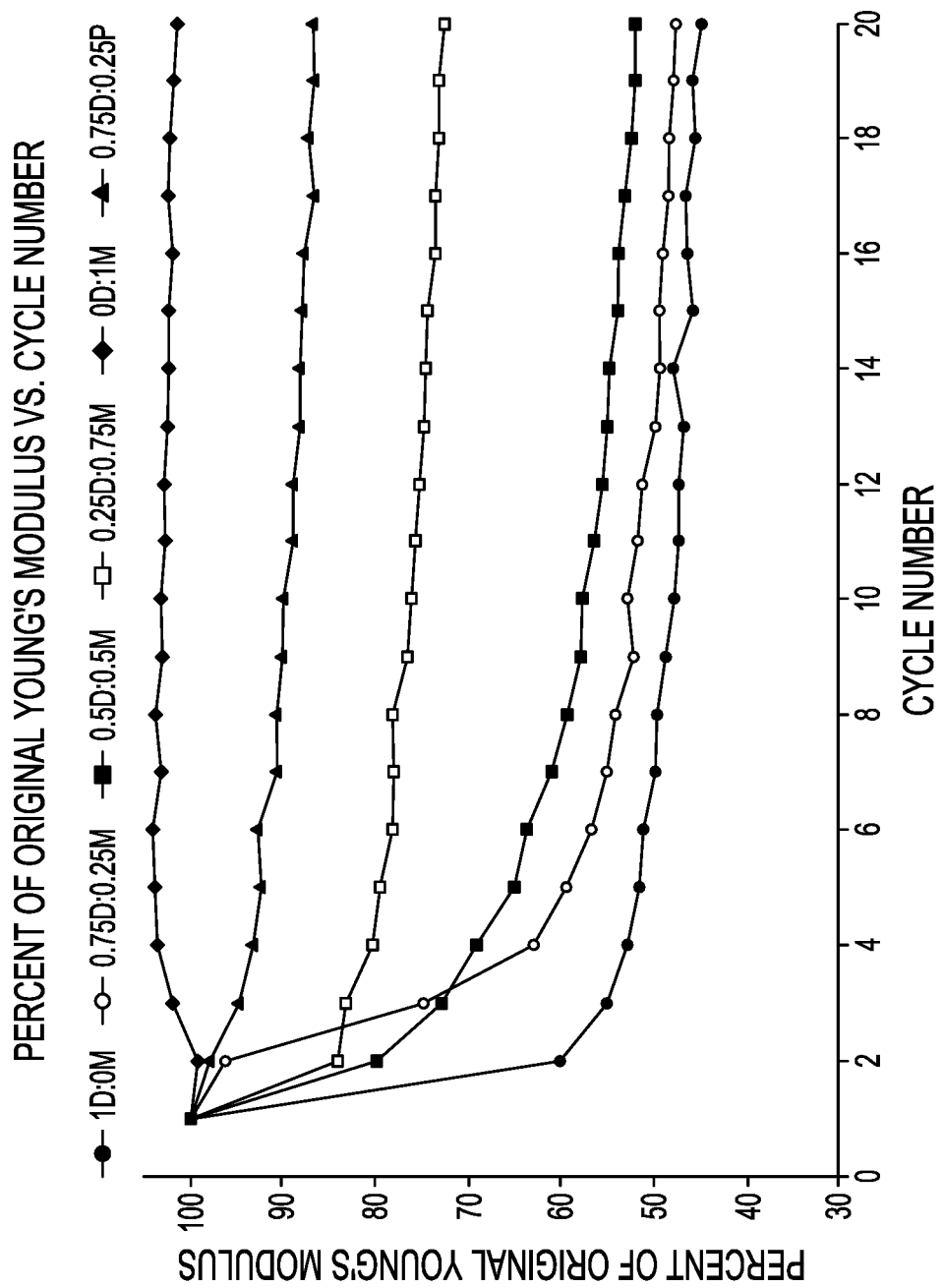
FIG. 2 illustrates a plot showing the percent of original Young's modulus versus the cycle number for polyacetals formed from glutaraldehyde with various ratios of digycerol to erythritol or pentaerythritol, in accordance with various embodiments.

FIG. 2 illustrates a plot showing the percent of original Young's modulus versus the cycle number. Dog bone samples were prepared and stretched through 20 cycles at a rate of 5 mm/min with no rest between cycles. Data for all compositions are based on an average of results for three or more samples. M=erythritol, D=diglycerol, and P=pentaerythritol. Samples were stretched to a length of 70 percent of the respective yield point for up to 20 cycles. The data shown in FIG. 2 demonstrates the percent change in Young's modulus relative to cycle number. Compositions including less than 75% erythritol exhibited a significant drop in Young's modulus following the first cycle and then began to plateau for subsequent cycles. In contrast, compositions with 75% erythritol or more led to a smaller initial decrease in Young's modulus compared to those polymers containing higher levels of diglycerol. Addition of 25% pentaerythritol led to a retention of 87% of the original Young's modulus following 20 cycles. In comparison, 25% erythritol retained only 47% of its original Young's modulus. 100% Erythritol exhibited an increase in Young's modulus following several cycles, which is consistent with some level of strain hardening behavior of the material.

Cyclic testing also indicated that resting between cycles leads to a significant recovery of the Young's modulus that was lost after the first cycle. For the polyacetal formed using 25:75 erythritol/diglycerol, a 1.25 h rest period led to complete recovery of the lost Young's modulus, whereas the polyacetal formed from a 25:75 pentaerythritol:diglycerol exhibited an increase of 22 percent in Young's modulus compared to its original value following a 19-h rest period.

Figure 3:
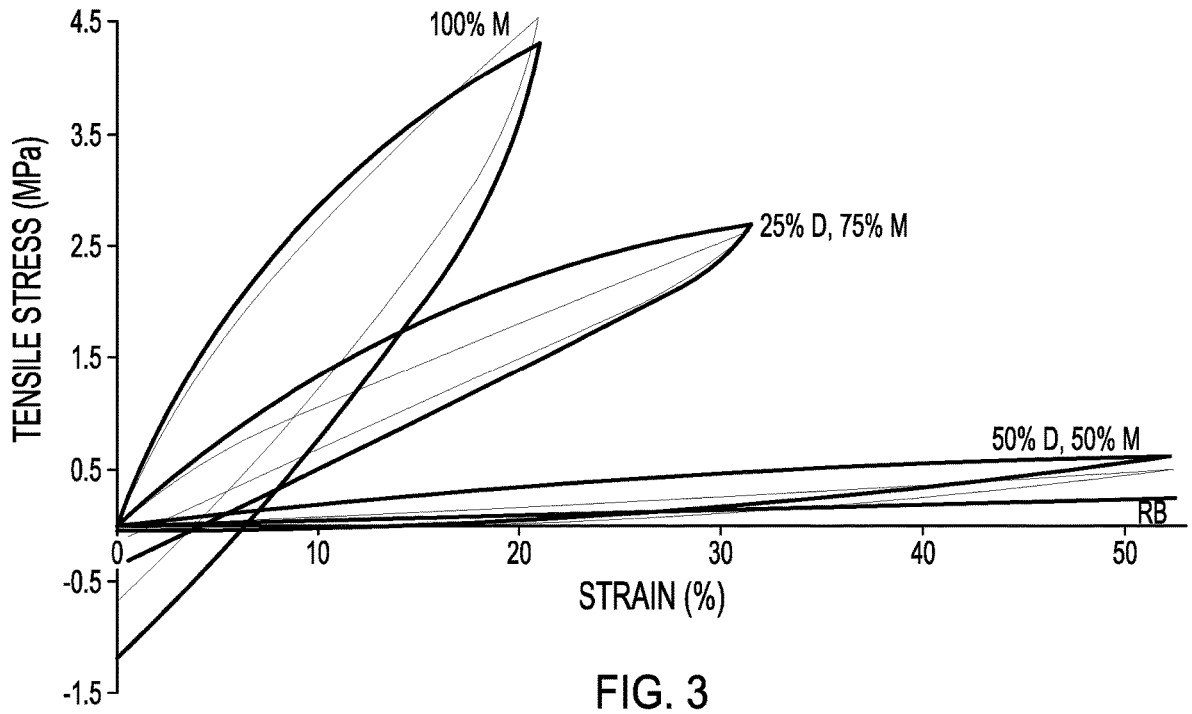
FIG. 3 illustrates a plot showing tensile stress versus strain for cyclical testing of polyacetals formed from polymerizing glutaraldehyde with ratios of erythritol to diglycerol of 50% or higher, in accordance with various embodiments.
Figure 4:
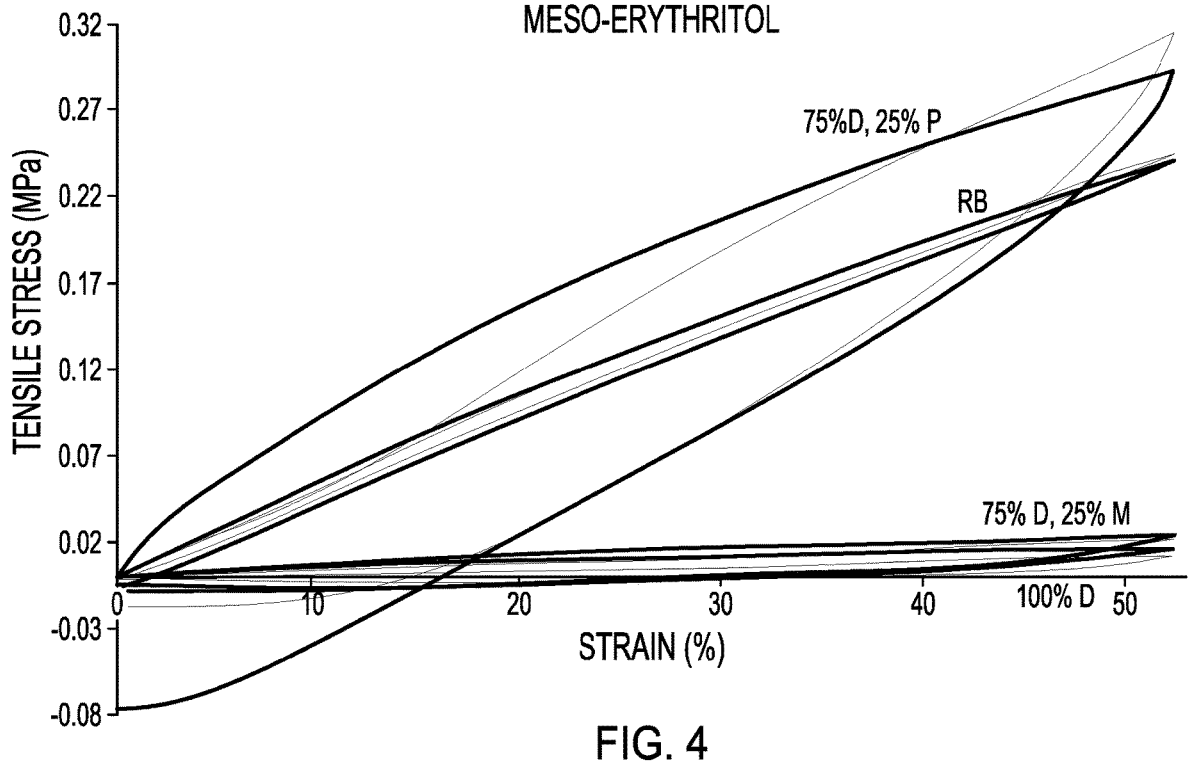
FIG. 4 illustrates a plot showing tensile stress versus strain for cyclical testing of polyacetals formed from polymerizing glutaraldehyde with ratios of erythritol or pentaerythritol to diglycerol of less than 50%, in accordance with various embodiments.

FIG. 3 illustrates a plot showing cyclical testing of polyacetals formed with 50% or higher proportions of erythritol to diglycerol. FIG. 4 illustrates a plot showing cyclical testing of polyacetals formed with less than 50% proportion of erythritol or pentaerythritol to diglycerol. FIGS. 3 and 4 show the first and twentieth hysteresis loops of the materials. RB=rubber band, M=erythritol, D=diglycerol, and P=pentaerythritol. The darker lines indicate cycle 1 and the lighter lights indicate cycle 20. Tests were performed at a rate of 5 mm/min and taken to a length corresponding to roughly 70% of the respective yield point. The overlays shown in FIGS. 3 and 4 further revealed each material's response to repeated uniaxial stress without rest. As mentioned previously, several polyacetal compositions demonstrated a reduction in Young's modulus after the first cycle, and this reduction is evident in the curves in FIGS. 3 and 4. Comparisons between polyacetal samples indicates that compositions prepared with 25% erythritol in the monomer feed (as shown in FIG. 4) exhibited lower tensile stress during repeated cycles compared with a rubber band, whereas the material prepared with 25% pentaerythritol had properties much closer to those properties of a rubber band within stress/strain regime explored. Polymer formed from 50% erythritol also had properties similar to that of rubber band (as shown in FIG. 3). However, as the percentage of erythritol was further increased in the monomer feed, the materials became significantly stronger. It should be noted that these latter materials were necessarily stretched to a lesser strain value because the samples reached their yield points earlier than the other compositions.

The rubber band exhibited a Young's modulus, tensile strength at break, and percent elongation at break of 0.54 MPa, 14.6 MPa, and 3,500% respectively (averages of three trials), and subjecting the rubber band to twenty cycles showed 100% retention of Young's modulus.

Figure 5:
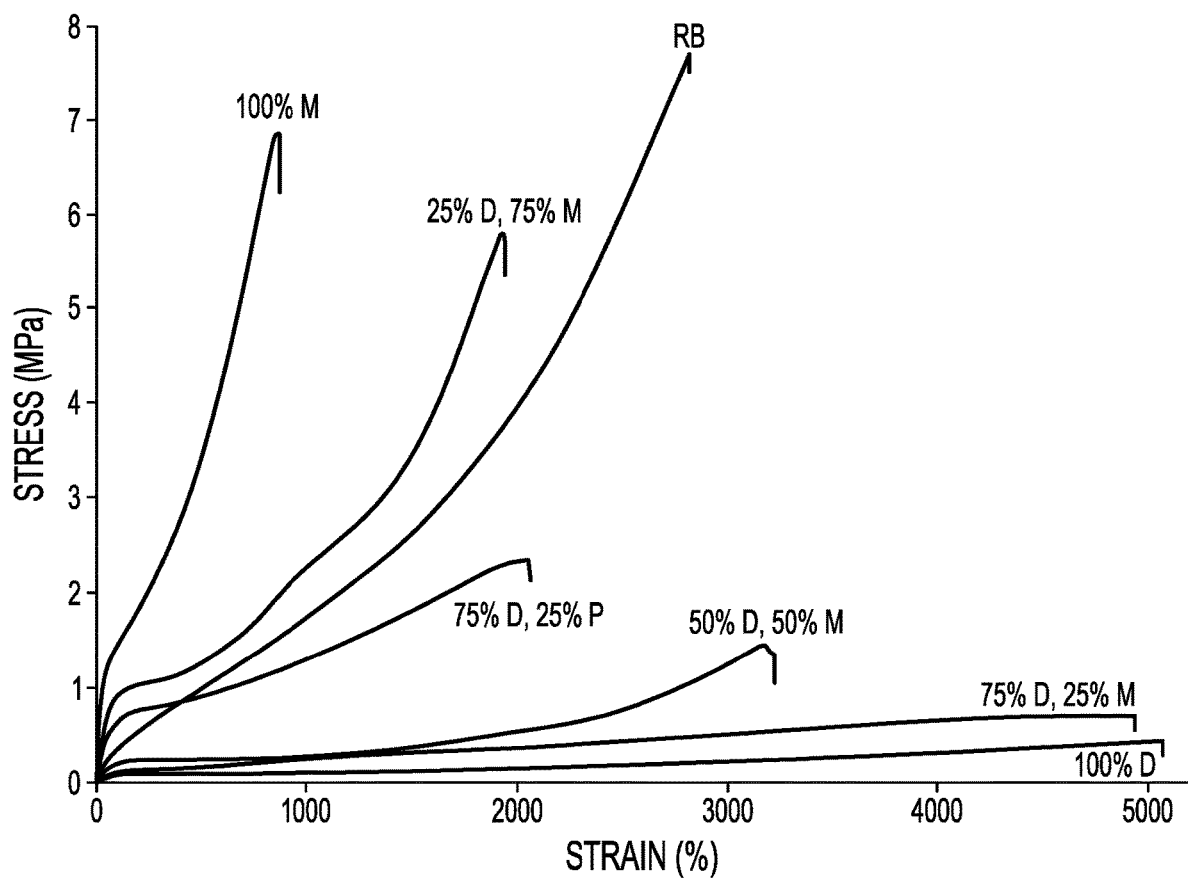
FIG. 5 illustrates a plot showing stress versus strain for polyacetals formed from glutaraldehyde with various ratios of digycerol to erythritol or pentaerythritol, in accordance with various embodiments.

FIG. 5 illustrates a plot showing stress versus strain for the samples, and for the rubber band.

EXEMPLARY EMBODIMENTS

The following exemplary embodiments are provided, the numbering of which is not to be construed as designating levels of importance:

Embodiment 1 provides a polymer comprising monomers according to one or more of Formula I, Formula II and Formula III:

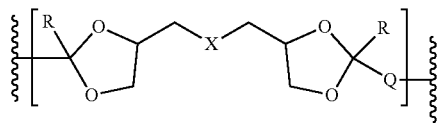

Formula I

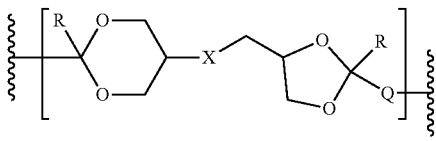

Formula II

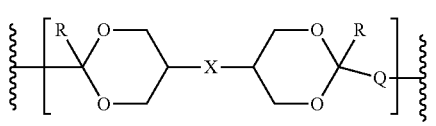

Formula III wherein
at each occurrence, R is a monovalent group independently selected from H, substituted $C_1$-$C_{10}$ alkyl, unsubstituted $C_1$-$C_{10}$ alkyl, substituted aryl, unsubstituted aryl, substituted heteroaryl, and unsubstituted heteroaryl;

at each occurrence, Q is independently a bond or a divalent linking group; and at each occurrence, X is independently —O— or —O—$(CH_2)_n$—O—, wherein n is an integer between 2 and 10.

Embodiment 2 provides the polymer of Embodiment 1, wherein monomers according to Formula I account for 50 mol % or more of total monomers in the polymer.

Embodiment 3 provides the polymer of Embodiment 1 or 2, wherein monomers according to Formula II account for more than 5 mol % of total monomers in the polymer.

Embodiment 4 provides the polymer of any one of Embodiments 1-3, wherein each occurrence of R is H.

Embodiment 5 provides the polymer of any one of Embodiments 1-4, wherein each occurrence of X is O.

Embodiment 6 provides the polymer of any one of Embodiments 1-5, wherein each occurrence of Q is independently a bond or a divalent linking group which has the structure: —$(CH_2)_m$—,

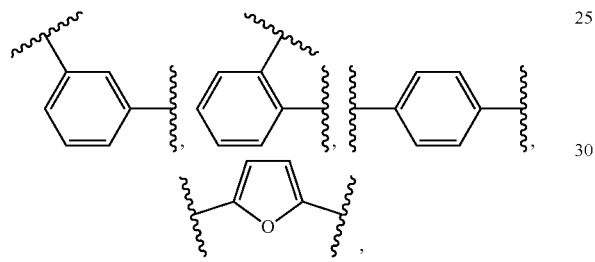

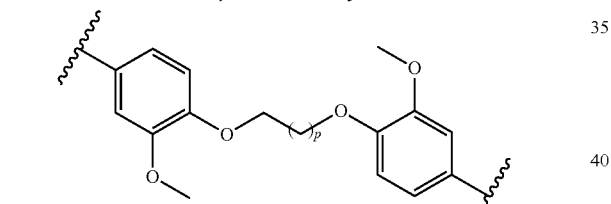

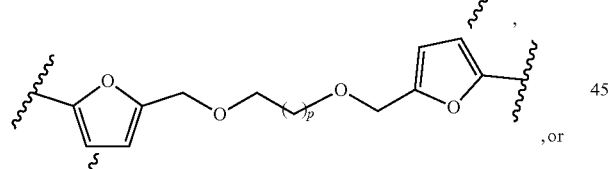

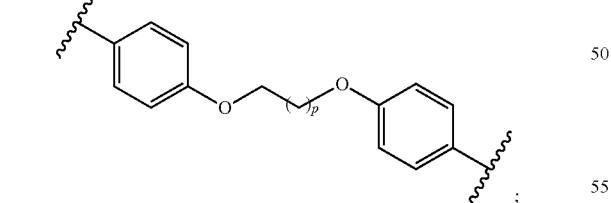

and each occurrence of m and p is an integer from 1 to 10.

Embodiment 7 provides the polymer of any one of Embodiments 1-5, wherein each occurrence of Q is independently a bond, a divalent aromatic group, or divalent $C_1$-$C_{10}$ alkylene.

Embodiment 8 provides the polymer of any one of Embodiments 1-5, wherein Q is —$CH_2CH_2CH_2$—

Embodiment 9 provides the polymer of any one of Embodiments 1-8, further comprising monomers according to one or more of Formula IV, Formula V, Formula VI, Formula VII, Formula VIII, Formula IX, Formula X, Formula XI, Formula XII, and Formula XIII:

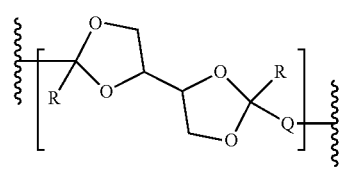

Formula IV

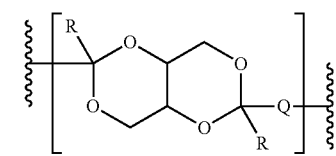

Formula V

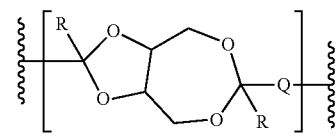

Formula VI

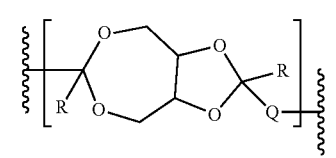

Formula VII

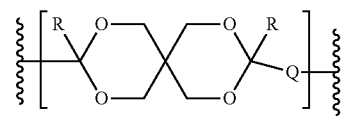

Formula VIII

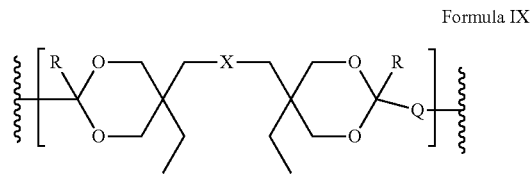

Formula IX

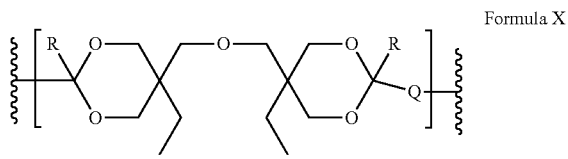

Formula X

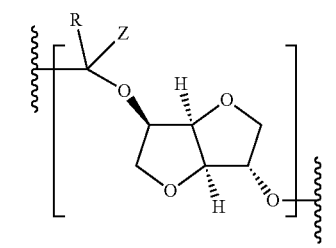

Formula XI

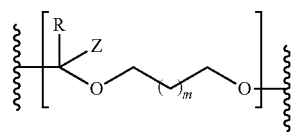

Formula XII

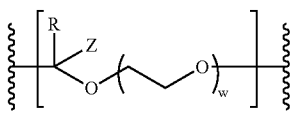

Formula XIII wherein
at each occurrence, R is a monovalent group independently selected from H, substituted $C_1$-$C_{10}$ alkyl, unsubstituted $C_1$-$C_{10}$ alkyl, substituted aryl, unsubstituted aryl, substituted heteroaryl, and unsubstituted heteroaryl,
at each occurrence, Q is independently a bond, a divalent $C_1$-$C_{10}$ alkylene, or a divalent aromatic group;
at each occurrence, X is independently —O— or —O—$(CH_2)_n$—O—;
at each occurrence, Z is independently H, substituted $C_1$-$C_{10}$ alkyl, unsubstituted $C_1$-$C_{10}$ alkyl, substituted aryl, unsubstituted aryl, substituted heteroaryl, unsubstituted heteroaryl, substituted arylalkyl, or unsubstituted arylalkyl; or a bond connected to a monomer of any one of Formula I-XIII;
at each occurrence, n is independently an integer from 2 to 10;
at each occurrence, m is independently an integer from 3 to 10; and
at each occurrence, w is independently an integer from 2 to 10.

Embodiment 10 provides the polymer of any one of Embodiments 1-9, wherein the polymer has a number average molecular weight ($M_n$) of 30,000 g/mol or greater.

Embodiment 11 provides the polymer of any one of Embodiments 1-10, comprising monomers according to each of Formula I, Formula II and Formula III.

Embodiment 12 provides the polymer of any one of Embodiments 1-11, wherein the proportion of monomers of Formula I:Formula II is about 2:1 to about 20:1 and the proportion of monomers of Formula II:Formula III is about 2:1 to about 20:1

Embodiment 13 provides the polymer of any one of Embodiments 1-12, comprising the structure:

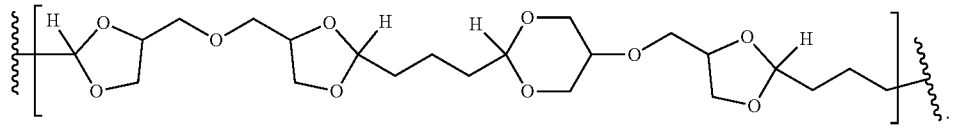

Embodiment 14 provides the polymer of any one of Embodiments 1-10, substantially free of monomers of Formula II, Formula III or both.

Embodiment 15 provides a reversibly crosslinked polymer comprising monomers according to one or more of Formula XI, Formula XII and Formula XIII:

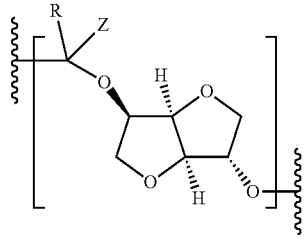

Formula XI

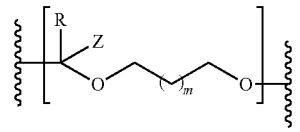

Formula XII

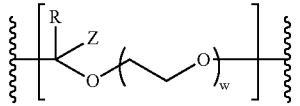

Formula XIII wherein
at each occurrence, R is independently H, substituted $C_1$-$C_{10}$ alkyl, unsubstituted $C_1$-$C_{10}$ alkyl, substituted aryl, unsubstituted aryl, substituted heteroaryl, unsubstituted heteroaryl, substituted arylalkyl, or unsubstituted arylalkyl;
at each occurrence, m is independently an integer from 3 to 10;
at each occurrence, w is independently an integer from 2 to 10;
at each occurrence, Z is independently H, substituted $C_1$-$C_{10}$ alkyl, unsubstituted $C_1$-$C_{10}$ alkyl, substituted aryl, unsubstituted aryl, substituted heteroaryl, unsubstituted heteroaryl, substituted arylalkyl, or unsubstituted arylalkyl, -Q-CHO, -Q-CH(OH)$_2$, -Q-CH(OCH$_3$)$_2$, -Q-CH(OCH$_2$CH$_3$)$_2$, or a divalent -Q- group linked to a further monomer unit; and at each occurrence, Q is independently a bond or a divalent linking group.

Embodiment 16 provides the polymer of Embodiment 15, wherein at one or more occurrence, Z is Q linked to a monomer so as to form a crosslinked polymer.

Embodiment 17 provides the polymer of Embodiment 15 or 16, wherein at one or more occurrence, Z is Q linked to a monomer according to one or more of Formula I, Formula II and Formula III:

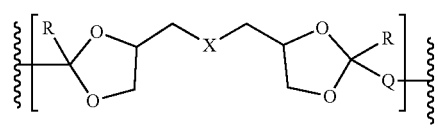

Formula I

-continued

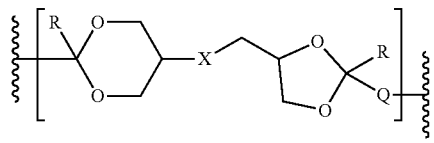
Formula II

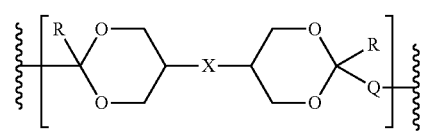
Formula III wherein each occurrence of X is independently —O— or —O—(CH$_2$)$_n$—O—, wherein n is an integer between 2 and 10.

Embodiment 18 provides the polymer of any one of Embodiments 15-17, comprising the structure:

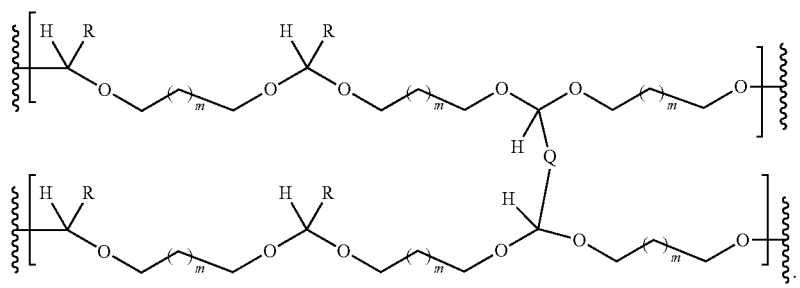

Embodiment 19 provides a method of preparing a poly (acetal) polymer, comprising:
mixing a diglycerol with a compound of Formula XIV,

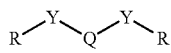
Formula XIV wherein
at each occurrence, Y is independently —C(O)— or —C(O(CH$_2$)$_y$H)$_2$—, wherein each occurrence of y is independently an integer from 0 to 3;
at each occurrence, R is independently H, substituted C$_1$-C$_{10}$ alkyl, unsubstituted C$_1$-C$_{10}$ alkyl, substituted aryl, unsubstituted aryl, substituted heteroaryl, unsubstituted heteroaryl, substituted arylalkyl, or unsubstituted arylalkyl; and
Q is independently a bond or a divalent linking group;
treating the mixture with heat, an acid, or both; and
removing a solvent byproduct produced from the mixture, to obtain the poly(acetal) polymer.

Embodiment 20 provides the method of Embodiment 19, wherein the diglycerol is α,α-diglycerol, α,β-diglycerol, β,β-diglycerol, or a mixture thereof.

Embodiment 21 provides the method of Embodiments 19 or 20, wherein the solvent byproduct is water or a C$_1$-C$_3$ alcohol.

Embodiment 22 provides the method of any one of Embodiments 19-21, wherein the solvent byproduct is removed via distillation, a drying agent, or both.

Embodiment 23 provides the method of any one of Embodiments 19-22, further comprising neutralizing the acid with triethanolamine.

Embodiment 24 provides a polymer prepared according to the method of any one of Embodiments 19-23.

Embodiment 25 provides the polymer or method of any one or any combination of Embodiments 1-24 optionally configured such that all elements or options recited are available to use or select from.

What is claimed is:

1. A polymer comprising monomers according to one or more of Formula I, Formula II and Formula III:

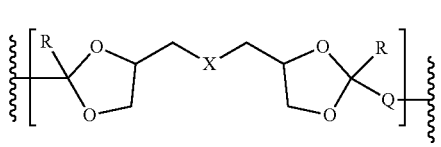
Formula I

-continued

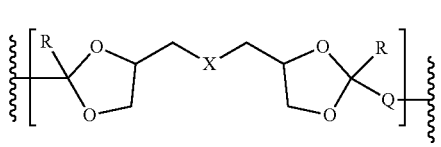
Formula II

Formula III wherein
at each occurrence, R is a monovalent group independently selected from H, substituted C$_1$-C$_{10}$ alkyl, unsubstituted C$_1$-C$_{10}$ alkyl, substituted aryl, unsubstituted aryl, substituted heteroaryl, and unsubstituted heteroaryl;
at each occurrence, Q is independently a divalent aromatic group, or divalent C$_1$-C$_{10}$ alkylene; and
at each occurrence, X is independently —O— or —O—(CH$_2$)$_n$—O—, wherein n is an integer between 2 and 10.

2. The polymer of claim 1, wherein monomers according to Formula I account for 50 mol % or more of total monomers in the polymer.

3. A polymer comprising monomers according to one or more of Formula I, Formula II and Formula III:

Formula I

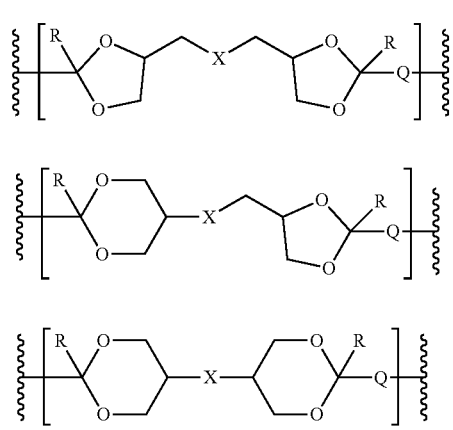

Formula II

Formula III wherein
- at each occurrence, R is a monovalent group independently selected from H, substituted $C_1$-$C_{10}$ alkyl, unsubstituted $C_1$-$C_{10}$ alkyl, substituted aryl, unsubstituted aryl, substituted heteroaryl, and unsubstituted heteroaryl;
- at each occurrence, Q is independently a bond or a divalent linking group; and
- at each occurrence, X is independently —O— or —O—$(CH_2)_n$—O—, wherein n is an integer between 2 and 10, wherein monomers according to Formula II account for more than 5 mol % of total monomers in the polymer.

4. The polymer of claim 1, wherein each occurrence of R is H.

5. The polymer of claim 1, wherein each occurrence of X is O.

6. The polymer of claim 1, wherein, at each occurrence, Q is independently a divalent linking group which has the structure:

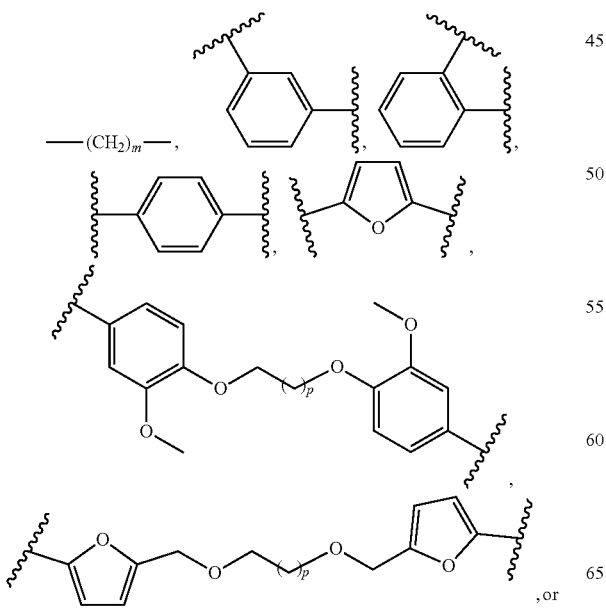

—$(CH_2)_m$—, and
each occurrence of m and p is an integer from 1 to 10.

7. A polymer comprising monomers according to one or more of Formula I, Formula II and Formula III:

Formula I

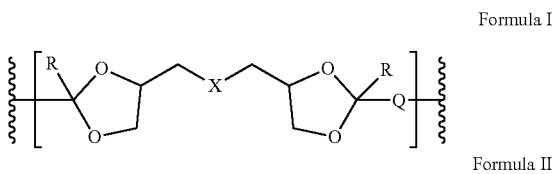

Formula II

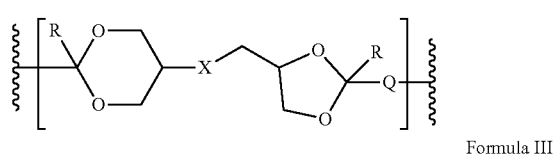

Formula III

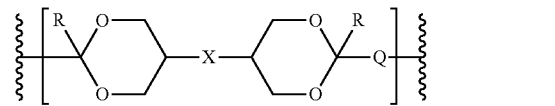

wherein
- at each occurrence, R is a monovalent group independently selected from H, substituted $C_1$-$C_{10}$ alkyl, unsubstituted $C_1$-$C_{10}$ alkyl, substituted aryl, unsubstituted aryl, substituted heteroaryl, and unsubstituted heteroaryl;
- at each occurrence, Q is —$CH_2CH_2CH_2$; and
- at each occurrence, X is independently —O— or —O—$(CH_2)_n$—O—, wherein n is an integer between 2 and 10.

8. The polymer of claim 1, further comprising monomers according to one or more of Formula IV, Formula V, Formula VI, Formula VII, Formula VIII, Formula IX, Formula X, Formula XI, Formula XII and Formula XIII:

Formula IV

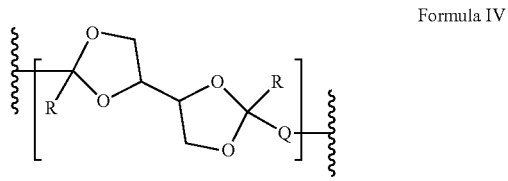

Formula V

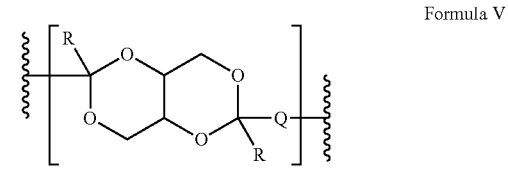

-continued

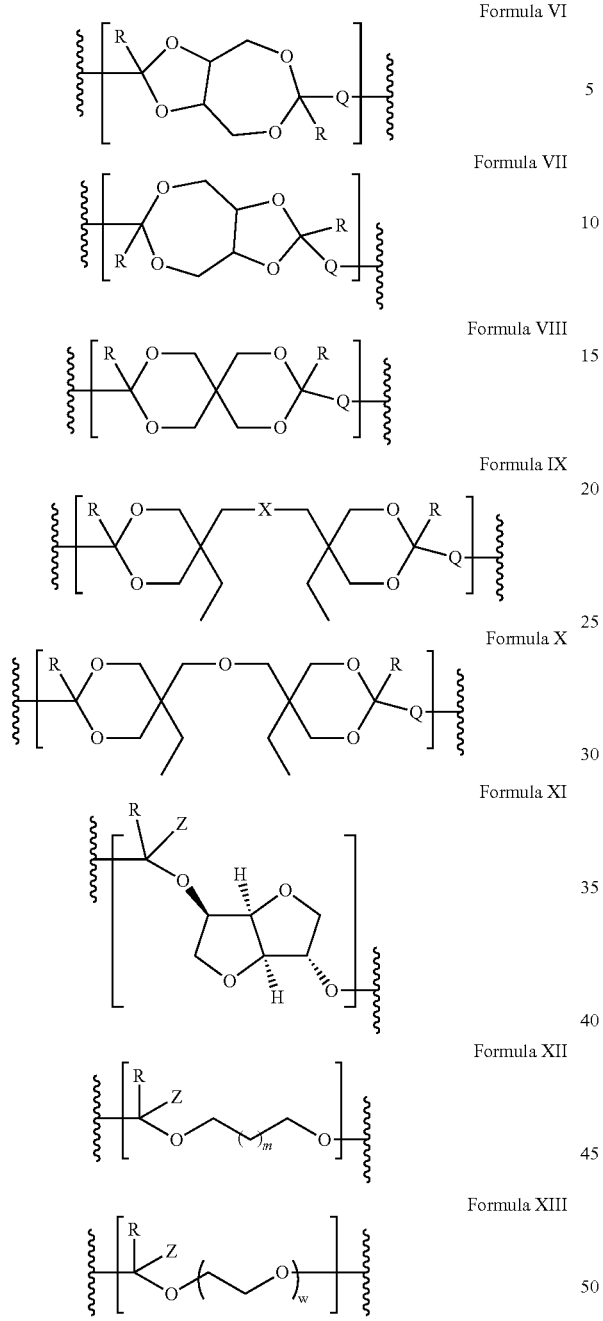

wherein
at each occurrence, R is a monovalent group independently selected from H, substituted $C_1$-$C_{10}$ alkyl, unsubstituted $C_1$-$C_{10}$ alkyl, substituted aryl, unsubstituted aryl, substituted heteroaryl, and unsubstituted heteroaryl;
at each occurrence, Q is independently a divalent $C_1$-$C_{10}$ alkylene, or a divalent aromatic group;
at each occurrence, X is independently —O— or —O—$(CH_2)_n$—O—;
at each occurrence, Z is independently H, substituted $C_1$-$C_{10}$ alkyl, unsubstituted $C_1$-$C_{10}$ alkyl, substituted aryl, unsubstituted aryl, substituted heteroaryl, unsubstituted heteroaryl, substituted arylalkyl, or unsubstituted arylalkyl; or a bond connected to a monomer of any one of Formula I-XIII;
at each occurrence, n is independently an integer from 2 to 10;
at each occurrence, m is independently an integer from 3 to 10; and
at each occurrence, w is independently an integer from 2 to 10.

9. The polymer of claim 1, wherein the polymer has a number average molecular weight ($M_n$) of 30,000 g/mol or greater.

10. A polymer comprising monomers according to each of Formula I, Formula II and Formula III:

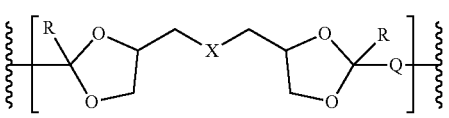

Formula I

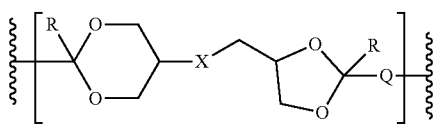

Formula II

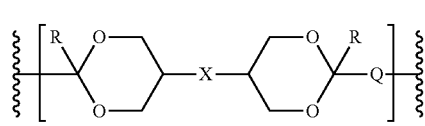

Formula III wherein
at each occurrence, R is a monovalent group independently selected from H, substituted $C_1$-$C_{10}$ alkyl, unsubstituted $C_1$-$C_{10}$ alkyl, substituted aryl, unsubstituted aryl, substituted heteroaryl, and unsubstituted heteroaryl;
at each occurrence, Q is independently a bond or a divalent linking group; and
at each occurrence, X is independently —O— or —O—$(CH_2)_n$—O—, wherein n is an integer between 2 and 10.

11. A polymer comprising monomers according to one or more of Formula I, Formula II and Formula III:

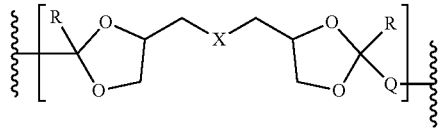

Formula I

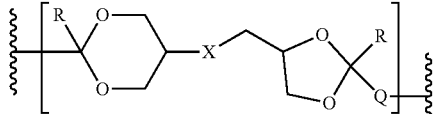

Formula II

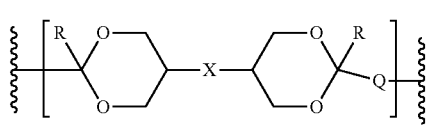

Formula III wherein
at each occurrence, R is a monovalent group independently selected from H, substituted $C_1$-$C_{10}$ alkyl, unsubstituted $C_1$-$C_{10}$ alkyl, substituted aryl, unsubstituted aryl, substituted heteroaryl, and unsubstituted heteroaryl;
at each occurrence, Q is independently a bond or a divalent linking group; and
at each occurrence, X is independently —O— or —O—$(CH_2)_n$—O—, wherein n is an integer between 2 and 10, and
further comprising the structure:

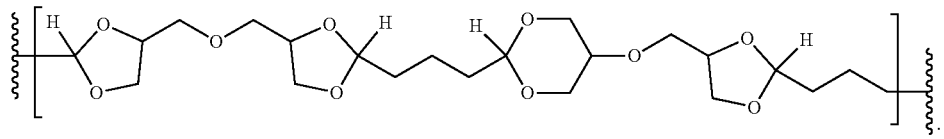

12. The polymer of claim 1, substantially free of monomers according to Formula II and Formula III.

13. The polymer of claim 1, further comprising monomers according to one or more of Formula XI, Formula XII and Formula XIII:

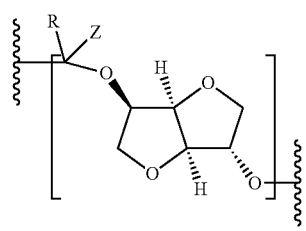

Formula XI

-continued

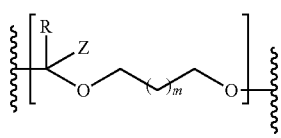

Formula XII

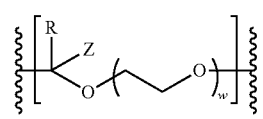

Formula XIII wherein
at each occurrence, R is a monovalent group independently selected from H, substituted $C_1$-$C_{10}$ alkyl, unsubstituted $C_1$-$C_{10}$ alkyl, substituted aryl, unsubstituted aryl, substituted heteroaryl, unsubstituted heteroaryl, substituted arylalkyl, and unsubstituted arylalkyl;
at each occurrence, m is independently an integer from 3 to 10;
at each occurrence, w is independently an integer from 2 to 10;
at each occurrence, Z is independently H, substituted $C_1$-$C_{10}$ alkyl, unsubstituted alkyl, substituted aryl, unsubstituted aryl, substituted heteroaryl, unsubstituted heteroaryl, substituted arylalkyl, or unsubstituted arylalkyl, -Q-CHO, -Q-CH(OH)$_2$, -Q-CH(OCH$_3$)$_2$, -Q-CH(OCH$_2$CH$_3$)$_2$, or a divalent -Q- group linked to a further monomer unit; and
at each occurrence, Q is independently a bond or a divalent linking group.

14. The polymer of claim 13, wherein at one or more occurrence, Z is Q linked to a further monomer unit so as to form a crosslinked polymer.

15. The polymer of claim 13, comprising the structure:

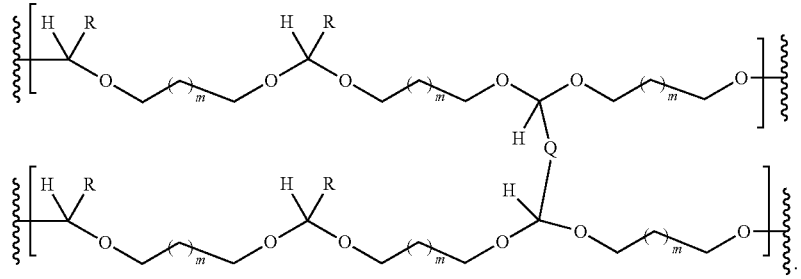

16. A method of preparing a poly(acetal) polymer, comprising:
mixing a diglycerol with a compound of Formula XIV,

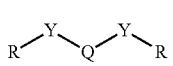

Formula XIV wherein
at each occurrence, Y is independently —C(O)— or —C(O(CH$_2$)$_y$H)$_2$—, wherein each occurrence of y is independently an integer from 0 to 3;

at each occurrence, R is a monovalent group independently selected from H, substituted $C_1$-$C_{10}$ alkyl, unsubstituted $C_1$-$C_{10}$ alkyl, substituted aryl, unsubstituted aryl, substituted heteroaryl, unsubstituted heteroaryl, substituted arylalkyl, and unsubstituted arylalkyl; and Q is independently a bond or a divalent linking group;

treating the mixture with heat, an acid, or both; and removing a solvent byproduct produced from the mixture, to obtain the poly(acetal) polymer.

17. The method of claim 16, wherein the diglycerol is α,α-diglycerol, α,β-diglycerol, β,β-diglycerol, or a mixture thereof.

18. The method of claim 16, wherein the solvent byproduct is water or a $C_1$-$C_{10}$ alcohol.

19. The method of claim 16, further comprising neutralizing the acid with triethanolamine.

\* \* \* \* \*